United States Patent
Gur et al.

(10) Patent No.: US 10,235,470 B2
(45) Date of Patent: Mar. 19, 2019

(54) USER RETRIEVAL ENHANCEMENT

(71) Applicant: HERE Global B.V., Veldhoven (NL)

(72) Inventors: Nadav Gur, Palo Alto, CA (US);
Stephen Young, Delta (CA); Ofer Melnik, Highland Park, NJ (US); Imri Goldberg, Zur Moshe (IL)

(73) Assignee: HERE Global B.V., Eindhoven (NL)

( * ) Notice: Subject to any disclaimer, the term of this patent is extended or adjusted under 35 U.S.C. 154(b) by 280 days.

(21) Appl. No.: 14/562,334

(22) Filed: Dec. 5, 2014

(65) Prior Publication Data
US 2015/0161271 A1    Jun. 11, 2015

Related U.S. Application Data

(60) Provisional application No. 61/912,811, filed on Dec. 6, 2013.

(51) Int. Cl.
| | |
|---|---|
| *G06F 17/00* | (2006.01) |
| *G06F 7/00* | (2006.01) |
| *G06F 17/30* | (2006.01) |

(52) U.S. Cl.
CPC .................. *G06F 17/3087* (2013.01)

(58) Field of Classification Search
CPC .................................. G06F 17/3087
USPC ........................................ 707/728
See application file for complete search history.

(56) References Cited

U.S. PATENT DOCUMENTS

| | | | | |
|---|---|---|---|---|
| 6,070,141 | A * | 5/2000 | Houvener | G06Q 20/04 235/380 |
| 8,005,685 | B1 | 8/2011 | Bird | |
| 8,239,130 | B1 * | 8/2012 | Upstill | G01C 21/3679 701/400 |
| 8,521,539 | B1 * | 8/2013 | Teng | G01C 21/3608 701/418 |
| 8,566,014 | B1 * | 10/2013 | Kozolchyk | G01C 21/3679 701/300 |
| 8,566,029 | B1 * | 10/2013 | Lopatenko | G08G 1/0962 701/426 |
| 8,589,069 | B1 * | 11/2013 | Lehman | G01C 21/20 340/995.1 |
| 8,595,225 | B1 * | 11/2013 | Singhal | G06F 17/30864 707/727 |
| 8,600,659 | B1 * | 12/2013 | Scherzinger | G01C 21/3682 701/25 |
| 8,645,366 | B1 * | 2/2014 | Acharya | G06F 17/3087 707/723 |
| 8,688,490 | B2 | 4/2014 | Rozell et al. | |
| 8,719,251 | B1 | 5/2014 | English et al. | |
| 8,819,053 | B1 | 8/2014 | Funaro | |

(Continued)

*Primary Examiner* — Pavan Mamillapalli
(74) *Attorney, Agent, or Firm* — Lempia Summerfield Katz LLC

(57) ABSTRACT

Systems and methods are described for performing a travel search and presenting search results to a user. A computing device may retrieve multiple travel documents and analyze the travel documents to identify points of interest. The computing device may analyze the subset of the travel documents that have points of interest or significant information regarding points of interest. The computing device is configured to calculate a POI relevance score based on text associated with the identified POIs. The POI relevance score indicates how likely the text is relevant to a travel search and rank the subset of the travel documents based on the POI relevance score.

20 Claims, 32 Drawing Sheets

(56) References Cited

U.S. PATENT DOCUMENTS

| | | | |
|---|---|---|---|
| 8,954,860 B1* | 2/2015 | Hands | G06F 17/30873 |
| | | | 715/738 |
| 9,104,293 B1* | 8/2015 | Kornfeld | G06F 3/04817 |
| 9,146,129 B1* | 9/2015 | Furio | G01C 21/3682 |
| 9,194,716 B1* | 11/2015 | Cutter | G01C 21/3679 |
| 9,282,161 B1* | 3/2016 | Hill | H04L 67/306 |
| 9,483,495 B1* | 11/2016 | James | G06Q 30/0627 |
| 9,710,873 B1* | 7/2017 | Hill | G06T 1/20 |
| 2006/0031215 A1* | 2/2006 | Pong Robert | G06F 17/3064 |
| 2006/0286519 A1* | 12/2006 | Burnham | G09B 23/28 |
| | | | 434/236 |
| 2006/0287810 A1* | 12/2006 | Sadri | G01C 21/20 |
| | | | 701/438 |
| 2010/0268673 A1* | 10/2010 | Quadracci | G06Q 10/10 |
| | | | 706/12 |
| 2011/0055043 A1* | 3/2011 | Shuchman | G06Q 10/025 |
| | | | 705/26.5 |
| 2011/0218830 A1 | 9/2011 | Gonzalez et al. | |
| 2012/0221363 A1 | 8/2012 | Slowe et al. | |
| 2012/0221595 A1 | 8/2012 | Slowe et al. | |
| 2013/0031506 A1 | 1/2013 | Diaz et al. | |
| 2013/0041902 A1 | 2/2013 | Swann et al. | |
| 2014/0188832 A1 | 7/2014 | Palivatkel | |
| 2014/0195525 A1 | 7/2014 | English et al. | |
| 2014/0236647 A1 | 8/2014 | Wettan | |
| 2015/0120756 A1* | 4/2015 | Grunick | G06F 17/30241 |
| | | | 707/748 |

* cited by examiner

| DOCUMENT TITLE | Travel Document | POI DOMINANT |
| --- | --- | --- |
| Doc 1 | Yes | No |
| Doc 2 | No | No |
| Doc 3 | No | No |
| Doc 4 | Yes | POI 1 |
| Doc 5 | Yes | POI 2 |
| Doc 6 | Yes | No |

| DOCUMENT TITLE | TRAIT INCLUSION SCORE | REVIEW INCLUSION SCORE | DOMINANCE MULTIPLIER | DOCUMENT TYPE |
|---|---|---|---|---|
| Doc 1 | X1 | Y1 | X1 | X1 |
| Doc 2 | X2 | Y2 | X2 | X2 |
| Doc 3 | X3 | Y3 | X3 | X3 |
| Doc 4 | X4 | Y4 | X4 | X4 |
| Doc 5 | X5 | Y5 | X5 | X5 |
| Doc 6 | X6 | Y6 | X6 | X6 |

FIG. 5

| POINT OF INTEREST | PROPERTIES | REVIEW SCORES | SENTIMENT | DOCUMENT SCORE |
|---|---|---|---|---|
| POI 1 | X1 | Y1 | X1 | X1 |
| POI 2 | X2 | Y2 | X2 | X2 |
| POI 3 | X3 | Y3 | X3 | X3 |
| POI 4 | X4 | Y4 | X4 | X4 |
| POI 5 | X5 | Y5 | X5 | X5 |
| POI 6 | X6 | Y6 | X6 | X6 |

Family friendly attractions in San Diego attribute:Family friendly    type:Attraction    ref-word    city:San Diego

PHASE 1

San Diego Zoo
Family Friendly: 0.8
San Diego: 1

Balboa Park
Family Friendly: 0.75
San Diego: 1

Del Mar City Beach
Family Friendly: 0.5
San Diego: 0.5

PHASE 2

San Diego Zoo
Family Friendly: Full
San Diego: Full
Extra: yes

Balboa Park
Family Friendly: Full
San Diego: Full
Extra: no

Del Mar City Beach
Family Friendly: Partial
San Diego: Partial
Extra: no

PHASE 3

GROUPING AND SCORING

FIG. 7

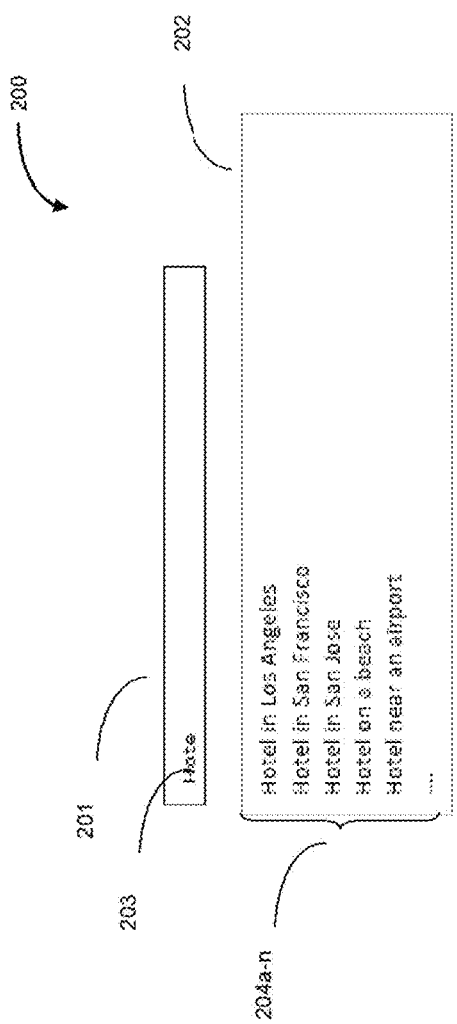
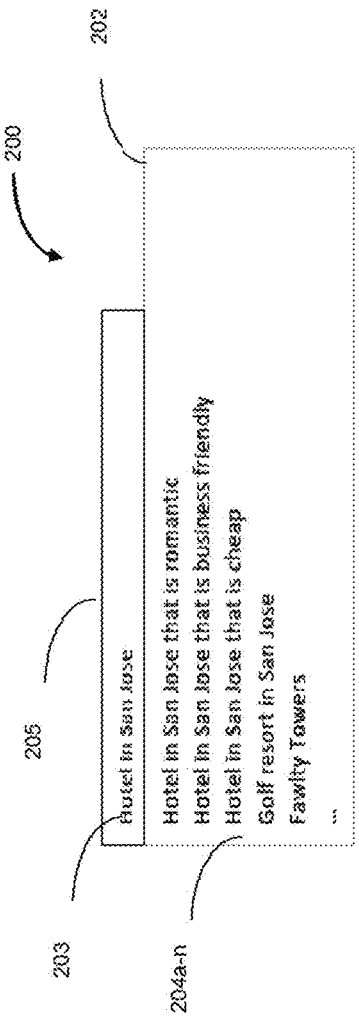

USER RETRIEVAL ENHANCEMENT

CROSS REFERENCE TO OTHER APPLICATIONS

This application claims the benefit of U.S. Provisional Application Ser. No. 61/912,811, filed Dec. 6, 2013, which is hereby incorporated by reference in its entirety.

FIELD

The following disclosure relates to methods and systems for user retrieval enhancement, or more particularly, to a travel search engine with user retrieval enhancement.

BACKGROUND

In the field of information search, including Internet search, vertical search, e-commerce related search and similar types of information search. The search assists end users in assessing the quality of information returned to them by an information retrieval system.

In a typical Information Retrieval (IR) system, a user enters queries and receives information that is, hopefully, relevant to the query and to the user. If the information sought is simple and objective the user can quickly ascertain whether it is relevant to the query. On the other hand, if the information sought is not completely objective, is complex, or is not obvious by simply looking at it, then the user is tasked with evaluating the quality of the results at a deeper level, to be convinced of their relevance, correctness and claims.

To facilitate the user's decision-making, an IR system should give the user information to support the results it returns. If the system is only returning specific items, for example web pages or documents, then the support usually consists of returning excerpts from the document that support the query and additional information about the document. In contrast, if the retrieval system handles more intangible information than documents, then it needs to demonstrate relevance by other methods; otherwise the user has no ability to decide about the quality of the results. For a system to support intangible results it needs to collect and generate supporting information and present it to the user in meaningful and useful ways.

SUMMARY

In one embodiment, a method or apparatus for performing the method includes retrieving a plurality of travel documents, identifying points of interest (POI) in the plurality of travel documents, analyzing a subset of the plurality of travel documents each having at least one of the points of interest, calculating a POI relevance score based on text associated with the identified POIs, wherein the POI relevance score indicates how likely the text is relevant to a travel search, and providing the subset of the plurality of travel documents in a ranked order based on the POI relevance score.

In another embodiment, a method or apparatus for performing the method includes receiving a travel search from a user, identifying a point of interest and a least one qualifying query from the travel search, receiving a subset of the plurality of travel documents ranked based at least on a POI relevance score, and presenting the subset of the plurality of travel documents in an order as ranked from the POI relevance score, by the processor, and based on the at least one qualifying query.

BRIEF DESCRIPTION OF THE DRAWINGS

Exemplary embodiments are described herein with reference to the following drawings.

FIG. 4 illustrates example classified travel documents.

FIG. 5 illustrates example database of travel documents.

FIG. 6 illustrates an example database of points of interest.

FIG. 7 illustrates an example travel search.

FIGS. 15A and 15B are an illustration of a variety of exemplary input user interfaces.

DETAILED DESCRIPTION

Figure 1:
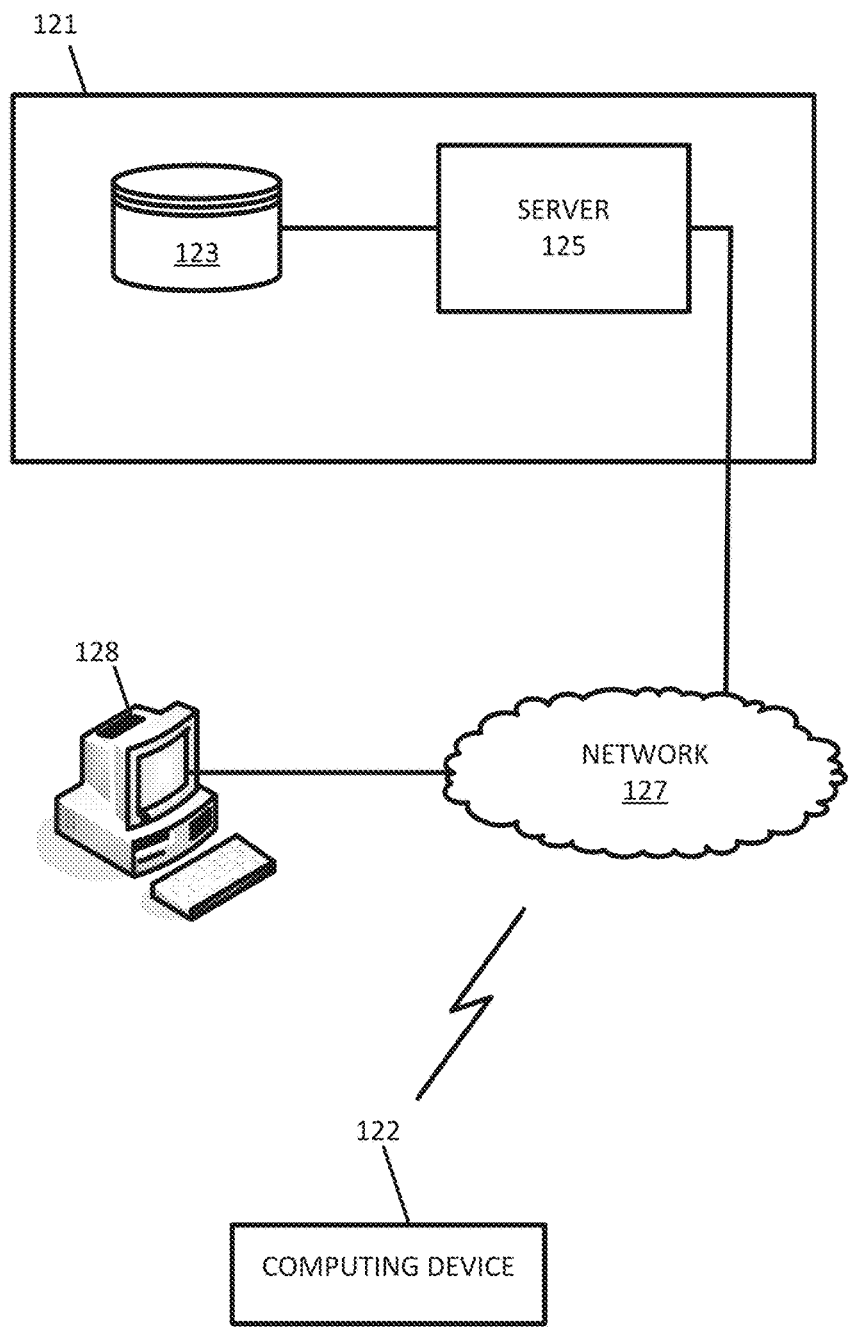
FIG. 1 illustrates an example system analyzing travel data.

Embodiments relate to new, computer-automated mechanisms solving the problem of how to collect, generate and display supporting information for retrieval results. For example, a retrieval system may return Items of Interest (IOI) in response to user queries. An IOI is a piece of information that the system determines could be interesting to a user, given particular queries. The vertical retrieval system discussed herein returns IOIs for queries within a particular application area of interest, and searchably indexes the IOIs so that queries can specify attributes/values of relevance specific to that particular segment of interest (vertical). This approach is in contrast to generic keyword-based web search engines that are generally not vertically specialized and so, for example, do not support attribute-based search within particular domains. In many applications of interest (or verticals)—such as search for consumer products, destinations, restaurants, movies/books/media content, just to name a few examples—the typical IOI is often something that can be (and has been) written about or described in a variety of forums, including third-party forums that are independent of and external to the retrieval application.

An enhanced vertical retrieval systems that improves on conventional systems by introducing computer-automated methods and systems to harvest and utilize what has been written and captured about IOIs in a variety of forums, and effectively integrating such "supporting information" together with search results.

For each IOI, all relevant textual documents that mention the IOI are collected and indexed within the system with the IOI. Careful selection of sources for starting materials enables both simplifying the work required, as well as further enhancing the quality of the results. For example, using certain vertical magazines or other readily available catalogues, in accordance with their respective use rights, can result in a better outcome. Further, if a user wants to understand why an IOI is cited as relevant to his or her search, the user can be referred to one or more of the source articles on that publisher's site, etc. These textual documents may be used in a number of ways, directly and indirectly as described below.

Each document is evaluated (manually or automatically) with regard to its type, authoritativeness, comprehensiveness, quality, trustworthiness and how criteria that may be indicated in user queries are present and indicated within the text. When an IOI is presented to a user, links to these documents may be presented to inform the user. These documents may be filtered based on any of the above criteria. For example, the system may only show documents that are considered trusted, or it may show only documents related to terms in the query that originally resulted in the IOI. Also, the documents can be sorted by any of the criteria. For example, the documents can be sorted by how comprehensively they deal with the IOI. In addition to providing links, the system may provide excerpted text from the document relating to the IOI; it may express a summary of the document content; or it may display numerical or graphical information about some of the evaluation measures of the document. The displayed information can be tailored to the specific query asked and as such the information displayed may reflect or emphasize the specific qualities of the IOI that relate to the query as reflected by the document.

With the information collected about individual documents, indirect support highlights can also be generated. For example, given a query, it is possible to say that an IOI is in the top 90 percent for a specific query criterion. This determination is made by using aggregate statistics on the document evaluations over populations of IOIs. Any standard statistical techniques can be used to generate indirect support for specific IOIs in particular queries.

Complementary to the above, for all IOIs all multimedia information about the IOIs may also be collected and indexed. Multimedia in this case includes but is not limited to images, diagrams, video, audio, three-dimensional models, virtual walk-throughs, and other virtual interactive media systems. This multimedia information may also be used in a similar way to demonstrate relevance to the user.

The multimedia information is evaluated (manually or automatically) on its type, quality, attractiveness, relevance to the IOI, relevance to the query, authoritativeness, size, format, compatibility with various computer systems, and trustworthiness. When an IOI is presented to a user, links to these multimedia elements may be presented to inform the user, or the actual multimedia elements themselves may be presented if the screen real estate is sufficient. These elements may be filtered based on any of the above criteria. For example, the system may only show elements that are of sufficient quality or relevance. Also, the elements may be sorted using any of these criteria or other relevant criteria. For example, the documents can be sorted by attractiveness, or they can be sorted to emphasize diversity of multimedia types, such that the user is quickly exposed to the different types available. In addition to providing links or the elements, the system may provide miniaturized images, icons, frames, clips or other forms that summarize the multimedia elements; or it may display numerical or graphical information about some of the evaluation measures of the element. The displayed information can be tailored to the specific query asked and as such the information displayed may reflect or emphasize the specific qualities of the IOI that relate to the query as reflected by the elements.

One or more of the described embodiments uses templates. A template is a mechanism for defining the structure of a variety of system-legal phrases. An example of a simple template is a fill-in-the-blank phrase. For example, "A hotel in _____ for _____ between _____ and _____ under $_____." is a template for a natural-language travel query that can be described this way "A <type> in <location> for <people> between <dates> under <price>," where the names tagged <tag> are fields.

This is a simple template example, but a template could potentially be any way of describing the structure of natural language phrases, including but not limited to any of the models in formal language theory (regular grammars, context-free, etc.) through probabilistic and combinatorial language models and more. The templates might be static, being fixed in advance, or they could be dynamic and generated on the fly, incorporating any additional information that is available to the system, as discussed below.

Consider a travel application in which the user presents the system with a travel question and the system in turn replies with options about places that are suitable for that question. For example, the user may ask for "a place to stay for two nights that's good for families with parking in San Francisco."

The system may include database information about different types of places to stay, hotels, motels, bed and breakfasts, etc., and it would retrieve, sort and display to the user information about these places. To support the results it returns, the system could have found various reviews, articles, blogs and other documents about the accommodations in San Francisco. Internally, it would have assessed their merit with respect to the above criteria of type, authoritativeness, comprehensiveness, quality, trustworthiness and appropriateness to the criteria of "family friendly" and "parking." Armed with this information it would present to the user snippets of these documents, links, summaries, and graphical descriptions in such a way that the most relevant and/or most convincing ones would be most apparent to the user.

In addition, the system would find assorted multimedia information about these places, including, but not limited to, images of the places' interiors, exteriors, and surrounding areas. It may also have found video clips about the place or area, possibly video or virtual walk-throughs, and maybe audio clips of people reviewing a place. The system would have to rate the relevance and appropriateness of these multimedia elements to the user's query and either display the relevant ones or links to them with summary information. For example, the system might choose to display high-quality images of a hotel's play room because the user is looking for "family friendly," or it may display a map of the hotel with surrounding parking lots to demonstrate the ample parking available. The system may also choose to show a room walk-through to demonstrate the quality of the hotel or a video of the nearby area to demonstrate the quality of the location.

FIG. 1 illustrates an example system analyzing travel data. The system 120 includes a developer system 121, one or more computing devices or mobile devices 122, a workstation 128, and a network 127. Additional, different, or fewer components may be provided. For example, many mobile devices 122 and/or workstations 128 connect with the network 127. The developer system 121 includes a server 125 and one or more databases. The database 123 may be a geographic database including road links or segments.

The server 125 may be configured to analyze documents from one or more sources. The sources may be accessible via the network 127 (e.g., the Internet). Example sources include periodicals such as online magazines and newspapers, customer review services, blogs, websites, and other sources of data. The server 125 may classify the documents as either travel related documents or not travel related documents. Techniques for classifying documents is described below.

The server 125 may be configured to analyze the travel documents to identify points of interest (POI). The points of interest may be identified by keyword, proper name, or an embedded flag or identifier. For example, the database 123 may include a list of known generic POI identifiers (e.g., restaurant, hotel, and attractions) and proper POI identifiers (e.g., Joe's Restaurant, Plaza Hotel, and AAA Fun Park). Travel documents that includes POI mentions may be flagged to form a subset of travel documents.

The server 125 may be configured to analyze the subset of the travel documents having points of interest. The analysis may identify tagging the travel documents such as compiling a list of POI mentioned in the travel documents. The server 125 may store a list of POIs indexed by document identifier in the database 123. The server 125 may extract excerpts from the travel documents as a function of the location of the POI in the text of the travel documents. The server 125 may extract semantic phrases that have the potential to specifically relate to travel search terms.

The server 125 may calculate a POI relevance score based on text associated with the identified POIs. The POI relevance score indicates the likelihood that the text is relevant to a travel search. The POI relevance score may have multiple components such as the traits included in the travel document (objective facts about the features of the POI), properties of the POI (subjective opinions regarding the features of the POI), review scores, sentiment of past visitors, and other information.

The server 125 may rank the subset of the travel documents based on the POI relevance score. The server 125 may select a predetermined number of high POI relevance scores. The predetermined number may be defined by a user preference, a size of the user interface, or another setting. The server 125 may store the ranked subset of travel documents for the POI. A separate list may be stored for multiple POI (e.g., each of the POIs identified from the travel documents).

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing. In other embodiments, the mobile device 122 or the workstation 128 performs a majority of the processing. In addition, the processing is divided substantially evenly between the server 125 and the mobile device 122 or workstation 128.

Figure 2:
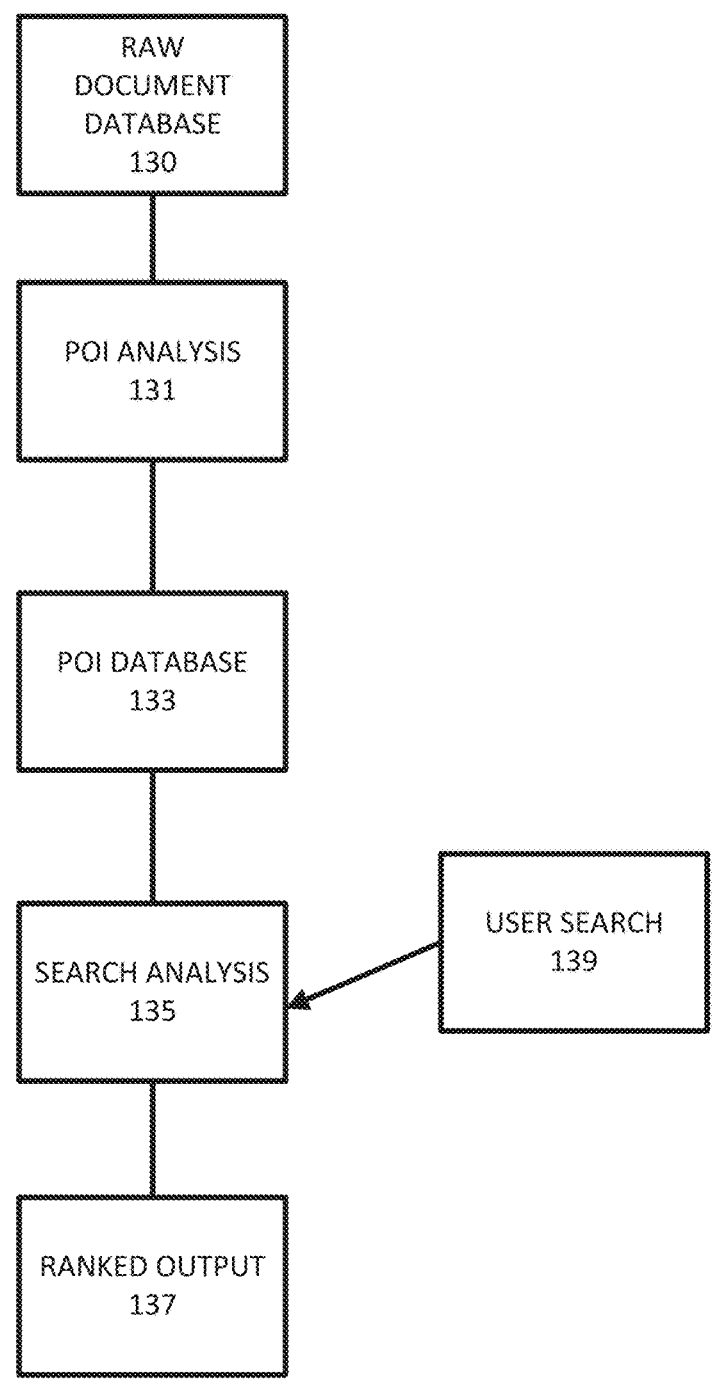
FIG. 2 illustrates an example analysis of points of interest in travel data.

FIG. 2 illustrates an example block diagram for a system to analyze travel documents and present travel information. The block diagram includes a raw document database 130, a POI analysis 131 performed by the server 125, a travel database 133, a search analysis 135 performed by server 125 according to a user search 139, and a ranked output 137. The raw document database 130 and/or the travel database 133 may be a portion of database 123. Additional, different, or fewer components may be included.

The raw document database 130 includes documents downloaded from one or more sources. The sources may include a periodical database for historical or back issues of magazines or newspapers. The sources may include searchable internet locations (e.g., uniform resource locations that have been crawled by a search engine. The sources may be search engine results. The search engines may be queried using a list of travel terms. One example for the travel terms is a list of destinations. Another example for the travel terms is a list of points of interest. Other travel terms may be used.

The POI analysis 131 represents an analysis of the documents to identify discussions of POIs. The POIs may be the same list of points of interest that may have been used to identify the documents. The POIs may be a different list of POIs. For example, a less expansive list including popular locations. The POI analysis 131 may determine how the POI is mentioned in the document. For example, the POI analysis 131 may identify how strong the discussion of the POI is in the document.

Figure 3:
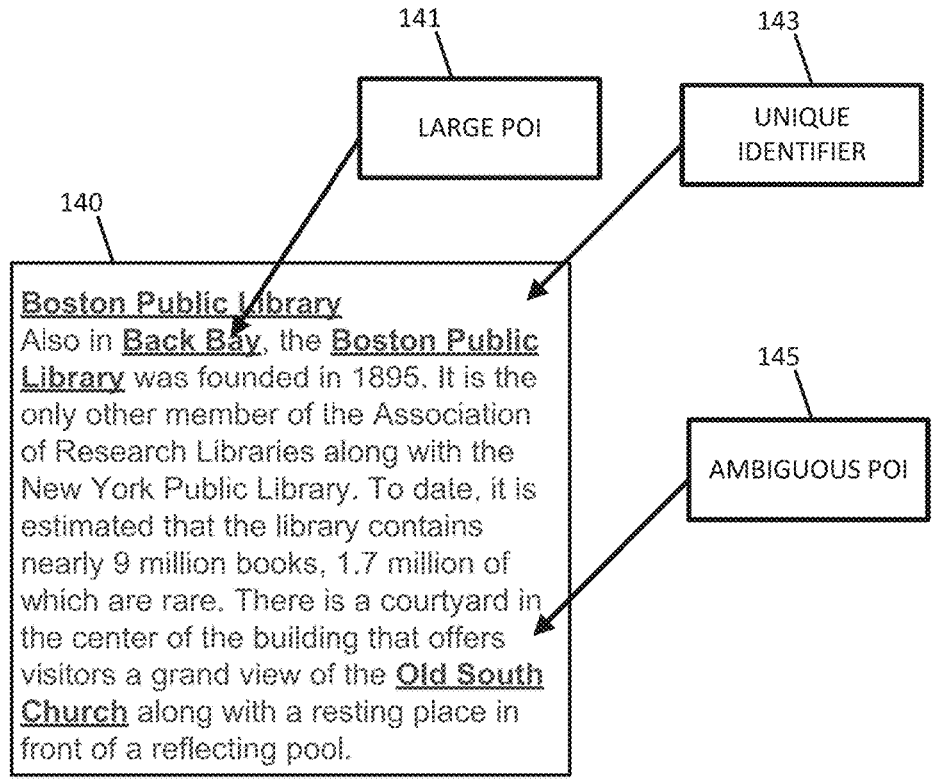
FIG. 3 illustrates example of identified points of interest in travel data.

FIG. 3 illustrates example of identified points of interest in travel data 140. The travel data example shown discusses that describes a geographic area (e.g., Boston), and multiple points of interest. The points of interest may include an ambiguous POI 145, a large region POI 141 and unique identifiers 143.

The server 125 (e.g., the POI analysis 131) is configured to separate the documents according to ambiguity. An ambiguous POI may be a POI that cannot be specifically identified from the document. There may be multiple locations with the same name or the name may be too generic to assign a particular address or geographic location. For example, as shown in FIG. 3, the ambiguous POI 145 is named "Old South Church." In one example, the POI is ambiguous because there are no corresponding database entries or more than one database entry. In another example, some documents may mention the POI only in passing. That is, the article mentions the POI without providing any relevant travel data.

The server 125 (e.g., the POI analysis 131) may determine that these types of mentions are ambiguous. For example, the server 125 may be configured to analyze the text associated with the points of interest to determine ambiguity scores for the points of interest. The ambiguity scores may be based on whether there is a corresponding database entry. The ambiguity scores may be based on the words of the POI. For example, generic terms such as south and church increase the ambiguity score, and specific terms such as Boston decrease the ambiguity score. The server 125 may compare the ambiguity score to a threshold. The server 125 may label documents as ambiguous with a score that exceeds the threshold and/or label documents as nonambiguous with a score that is less than the threshold. The server 125 may remove or delete documents in response to the ambiguity being above the threshold.

The non-ambiguous POIs may be further analyzed. The POIs may be separated from large regions 141 and unique identifiers 143. Unique identifiers describe specific locations such as businesses, parks, restaurants, or other locations. In one example, the unique locations may be defined as locations that can be identified as an address or set of geographic coordinates. For example, the Boston Public Library was identified in FIG. 3 as the unique identifier 143. Large regions describe towns, cities, counties or other regions. For example, the Black Bay was identified in FIG. 3 as the large POI 141. The server 125 may store the POIs and the travel documents in the travel database 133.

FIG. 4 illustrates an example lookup table 151 for the classified travel documents in the travel database 133. The lookup table 151 may include the document title, data indicative of whether the document is a travel document, and data indicative of whether the document includes a dominant POI. The lookup table 151 may include all the documents from the raw document database 130, or the lookup table 151 may be limited to documents that include non-ambiguous POIs.

The server 125 is configured to analyze the text of the document to determine whether the document is a travel document. The server 125 may classify the documents by title. For example, the server 125 may parse the title into keywords. The keywords may be adjectives and nouns. Certain parts of speech such as articles, prepositions, and verbs may be discarded. The server 125 may compare the keywords to a predefined list of travel related keywords to determine whether the document is a travel document. The server 125 may define a flag in the lookup table 151 that describes whether or not the document is a travel document.

The server 125 is configured to analyze the text of the document to determine whether the document includes a dominant POI. A dominant POI may be identified when only one POI is discussed in the document. A dominant POI may be identified when only one POI with a unique identifier is discussed in the document. Documents with dominant POIs are more likely to include relevant travel information. A dominant POI may be identified when a document has a predetermined number of occurrences for the name of the POI. The predetermined number may be 5, 10, or another number. For example, a document that references a hotel by name multiple times and/or references the hotel and no other POIs is very likely to be discussed the hotel in depth. Thus, the article likely includes facts regarding the hotel and/or opinions on the hotel. The server 125 may define a flag in the lookup table 151 that describes whether or not a travel document includes a dominant POI.

The server 125 may execute a learned model for determine whether accessed documents are travel documents and/or for determine whether a POI mentioned in the travel document is a dominant POI. The learned model may be a Bayesian model, a fuzzy logic model, a neural network, or a vector classification system. The Bayesian model includes probabilities that relates words or phrases to the outcome of a travel document or a dominant POI. The fuzzy logic model includes truth values between 0 and 1 relating words and phrases to the outcomes of a travel document or a dominant POI. The neural network includes nodes that classify words and phrases to the possible outcomes. The vector classification system assigns coefficient to words and phrases arranged in vectors and trains a model using the coefficients.

FIG. 5 illustrates an example lookup table 161 for the POI database 133 for the travel documents. The lookup table 161 characterizes the data included in the travel documents. The lookup table 161 includes the document name, a trait inclusion score, a review inclusion score, a dominance multiplier, and a document type. The document title name may be determined as described above.

The trait inclusion score may indicate how well specifics are known about the POI in the travel document. The trait inclusions score may be proportional to the number of traits that can be identified from the travel documents. Traits are facts that describe the POI (i.e., traits are not opinions or reviews). Example traits may include facts about the POI such as descriptions, features, hours of operation, location, directions, prices, and amenities available. The server 125 may be configured to identify traits from the text of the documents. A trait list may include keywords indicative of travel related traits and the server 125 compares the trait list to the text of the documents. The server 125 may calculate the trait inclusion score based on the number of traits. Alternatively, the trait inclusion score may be based the types of traits that are included. For example, hours of operation and prices may be weighted more heavily than other facts about the POI.

The server 125 is configured to analyze the travel documents to identify specific subset of traits for the POIs. The subset may be amenities available at the POI. Example amenities for a hotel may include a pool, play room, room service, gym, or other amenities. Example amenities for an attraction may be parking, food availability, or other amenities.

The server 125 is configured to analyze the of travel documents to identify reviews for the POIs. The review inclusion score may indicate whether customer reviews are included and/or how reliable the reviews are deemed to be. Example reviews may be descriptions and opinions that professional review services or other users have posted regarding the POI. The server 125 may identify customer reviews based on source (e.g., URLs of customer review websites, or consumer review services). The server 126 may identify customer reviews based on specific phrases or semantics included in the text of the travel documents.

The dominance multiplier may indicate whether the POI is dominant in the travel document. The dominance multiplier may be binary (i.e., having two values such as 1 for not dominant and 2 for dominant). The dominance multiplier may have multiple levels based on a degree of dominance based on a number of occurrences for the name of the POI.

The document type may describe the type of travel document. Example types of travel document includes top travel lists, official websites, POI reviews, blog posts, or other documents. The POI reviews may be articles that review a particular POI. The reviews may be user reviews on a collaborative website (e.g., Yelp, TripAdvisor, or others). Top travel lists describe a list of travel destinations (e.g., top 10 European destinations, trending vacation spots, or others). Blog posts may take many forms but are generally informal postings. Official websites may identified by the URL. The server 125 may be configured to analyze the text of the travel documents to identify the type of travel document. The server 125 may assign a travel type score based on the type of travel document. In one example, articles travel lists and reviews receive a higher score, articles dominated by a POI and official websites receive a medium score, and other documents receive a lower score.

FIG. 6 illustrates an example lookup table 163 for the database of points of interest. The lookup table 163 includes multiple entries for points of interest identified from the travel documents. An entry may include properties of the POI, review scores of the POI, sentiment data for the POI, and a document score for the document or set of documents listing the POI. The server 125 may perform the search analysis 135 for the user search 139 based on the data described above and/or the data in the lookup table 163 to calculate relevance scores for the POIs.

The properties of the POI are descriptions of the experience at the POI. Example properties include family friends, adult only, summer time, winter time, day time, fair weather only, or others. The properties may specify how the type of user that for whom the POI is tailored. The properties may specify the type of weather or the time of year for which the POI is tailored. The properties may specify whether the POI is romantic, suited for business, suited for children, or other subjective information about the POI.

The review scores of the POI may be calculated based on user reviews. The server 125 may cross reference a list of positive terms and a list of negative terms against the text of the travel document in connection with the POI. For example, inclusions of the positive terms in the travel document increase the review score for the POI, and inclusions of the negative term decrease the review score for the POI. A difference between a quantity of the positive terms and a quantity of the negative terms may be define the review score.

The sentiment data for the POI may include text from reviews that reflects the sentiment of the review. The sentiment data may include the text that is the basis for the review score. The document score for the document or set of documents listing the POI. The document score may be calculated based on any combination of the POI relevance score, the review score, trait inclusion score, ambiguity score, or other data.

The server 125 may be configured to extract a portion of the travel document. The extract may be the sentence surrounding words that matched one or more of the positive terms or one or more of the negative terms. The extract may be words near a POI identifier, travel terms, or trait terms described above. The extract may be a predetermined number of words surrounding any of these terms. The size of the extract may be based on the POI relevance score.

FIG. 7 illustrates an example travel search for a family friendly attractions in San Diego. The travel search may be entered by a user at the mobile device 122 or the workstation 128. The server 125 may parse the travel search into components such as attribute, type, reference word, and location. The example of FIG. 7 includes an attribute (property) of "family friendly," a type of "attractions," and a location of "San Diego." The reference word may include prepositions or other immaterial words.

Figure 8:
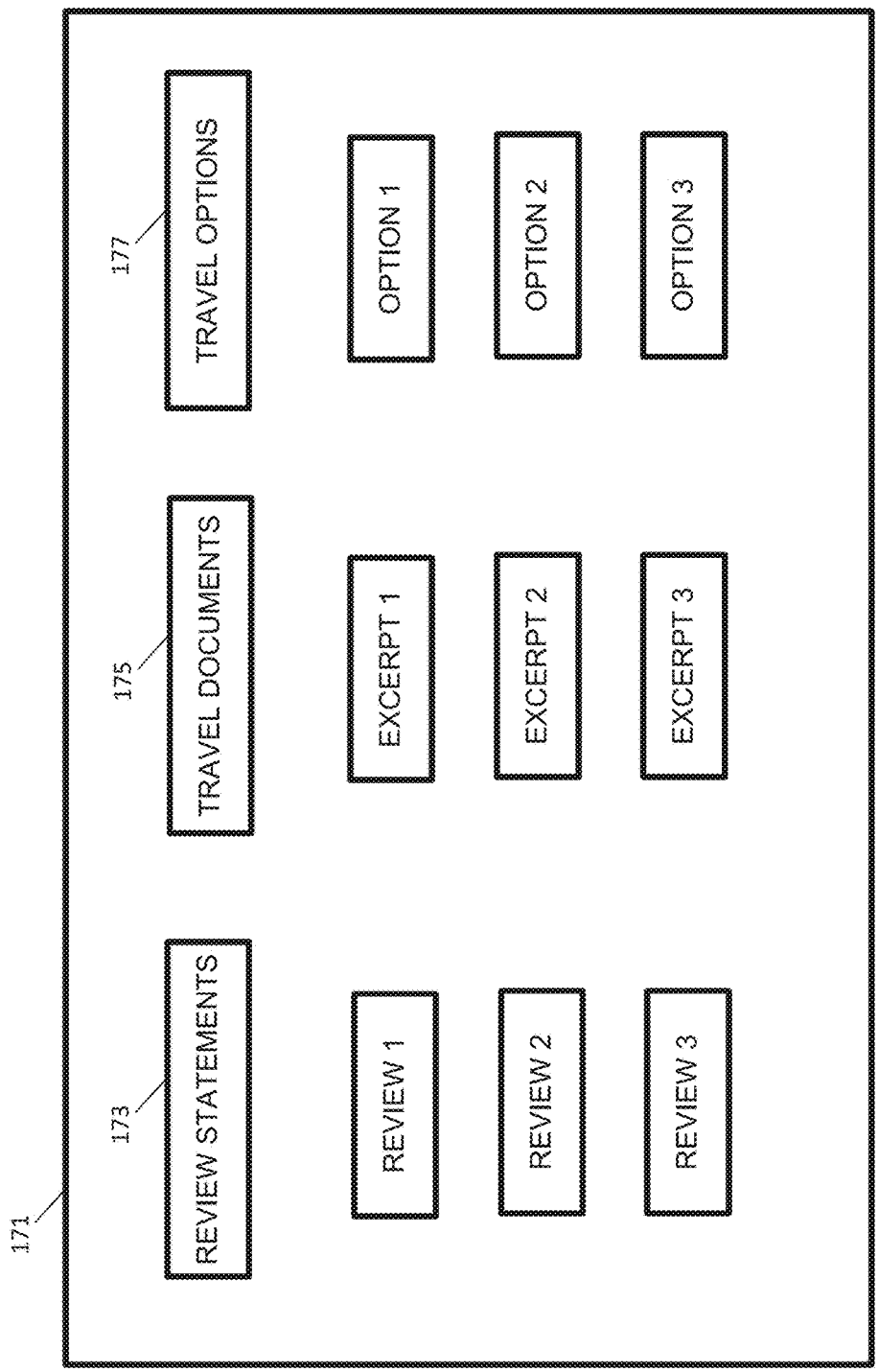
FIG. 8 illustrates an example user interface.

The server 125 may calculate a matching score for each of the POIs based on the terms of the travel search. For example, FIG. 7 illustrates phase 1 in which a degree of match is calculated between the attribute and the potential POI and a degree of match is calculated between the location and the potential POIs. For example, the phrase family friendly is a qualifying term in the travel search that the server 125 compares to potential POIs. The documents including the potential POI may be searched for the term family friendly or a list of terms indicative of the family friendly attribute. The degree of match may be a fractional value between 0 and 1. The example in FIG. 8 illustrates a degree of match of 0.8 for San Diego Zoo, 0.75 for Balboa Park, and 0.5 for Del Mar City Beach.

The server 125 may determine a distance between the location in the travel search and the locations in the POI list. The location of the POI list may be accessed from a geographic database (e.g., database 123). The server 125 may calculate the degree of match for location based on the distance. The degree of match may be defined according to distance ranges. The example in FIG. 8 illustrates a degree of match of 1 for San Diego and San Diego Zoo, a degree of match of 1.0 for San Diego and Balboa Park, and a degree of match of 0.5 for San Diego and Del Mar City Beach.

In phase 2 shown in FIG. 7, the server 125 analyzes the numeric values indicative of the degree of match, as gathered in phase 1, and determines whether a potential match is a full match, partial match, no match or inconclusive to the user search criteria. For example, the server 125 may compare the degree of match to one or more threshold. Between 1.0 and a high threshold (e.g., 0.7), the server 125 may determine a full match. Between the high threshold and a low threshold (e.g., 0.3), the server 125 may determine a partial match. Below, the low threshold, the server 125 may determine no match.

In phase 3, as shown in FIG. 7, the server 125 may rank the possible POIs in the ranked output 137. The ranking may be in the order of the matching score and/or POI relevance score of the POIs that match the travel search. The server 125 may calculate a product of a POI's matching score (e.g., value between 0 and 1) and a POI's relevance score (e.g., value between 0 and 1) so that the ranking depending on both how well the POI is a match and how much relevant information is known about the POI. Thus, obscure POIs will shift lower in the ranking, and popular POIs will shift higher in the ranking.

In one alternative, the server 125 may first group the POIs according to full match, partial match, and no match. The POIs that are classified as no match may be dismissed or deleted from memory. The full matches may be ranked first, but rather than according to matching score, in an order according to POI relevance score based on the prominence of the POI in the document. After the full matches, the partial matches may be ranked according to POI relevance score based on the prominence of the POI in the document.

The ranked output 137 may also depend on the qualifying term of the travel search. The qualifying term may be any term besides the POI name and the location included in the search. The server 125 is configured to filter possible search results according to the qualifying term. For example, a qualifying term score may be calculated based on comparing the qualifying term to keywords identified from the travel document.

FIG. 8 illustrates an example user interface 171. The user interface 171 may include multiple panes. The user interface 171 may include review statements 173, travel documents 175, and travel options 177. The review statements 173 may include excerpts from travel documents described above. The travel documents 175 may include the ranked lists according to any examples above. The travel options 177 may include information or hyperlinks related to purchasing travel options. The travel options 177 may be selected based on the ranked lists. That is, the server 125 may select the POIs according to the examples above and retrieve travel options 177 for the user to purchase. The travel options 177 may include flights, hotels, rental cars or other services.

Figure 9:
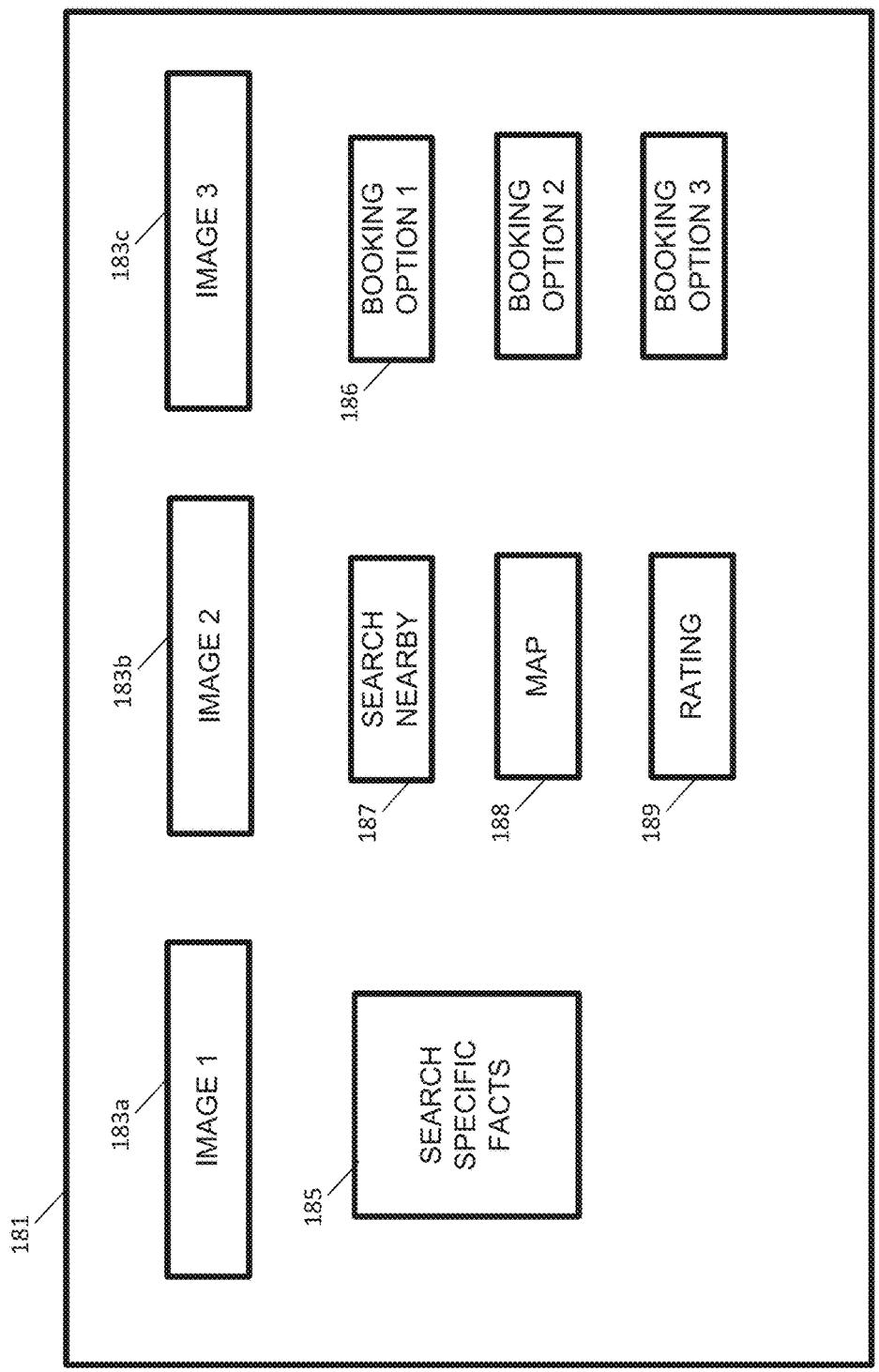
FIG. 9 illustrates another example user interface.

FIG. 9 illustrates another example user interface 181. The user interface 181 may be displayed after the user selects one of the POIs from the user interface 171. The user interface 181 may include images 183*a-c* related to the selected POI. The images 183*a-c* may be extracted from the travel documents.

The user interface 181 may also include search specific facts 185, booking options 186, a search nearby field 187, a map 188, and a rating 189. The search specific facts 185 may include the keywords of the travel search. The search specific facts 185 may include the words or phrases in the travel document that caused the POI to be returned in the results. The search nearby field 187 allows the user to search for other business or POIs in the geographic area around the selected POI. The map 188 may illustrate the geographic area around the selected POI. The rating 189 may provide a graphical illustration of the matching score or POI relevance score for the selected POI. The rating 189 may include a number of stars or numerical rating for the selected POI.

Figure 10:
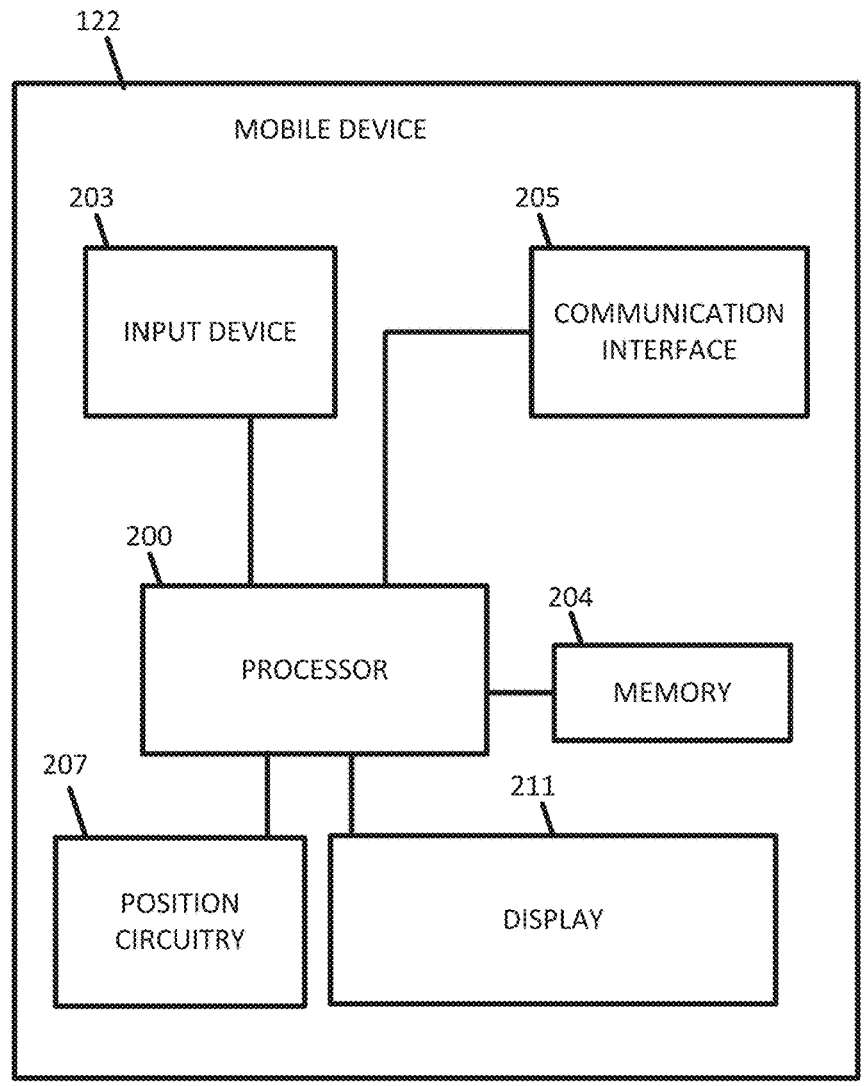
FIG. 10 illustrates example mobile device for the system of FIG. 1.
Figure 11:
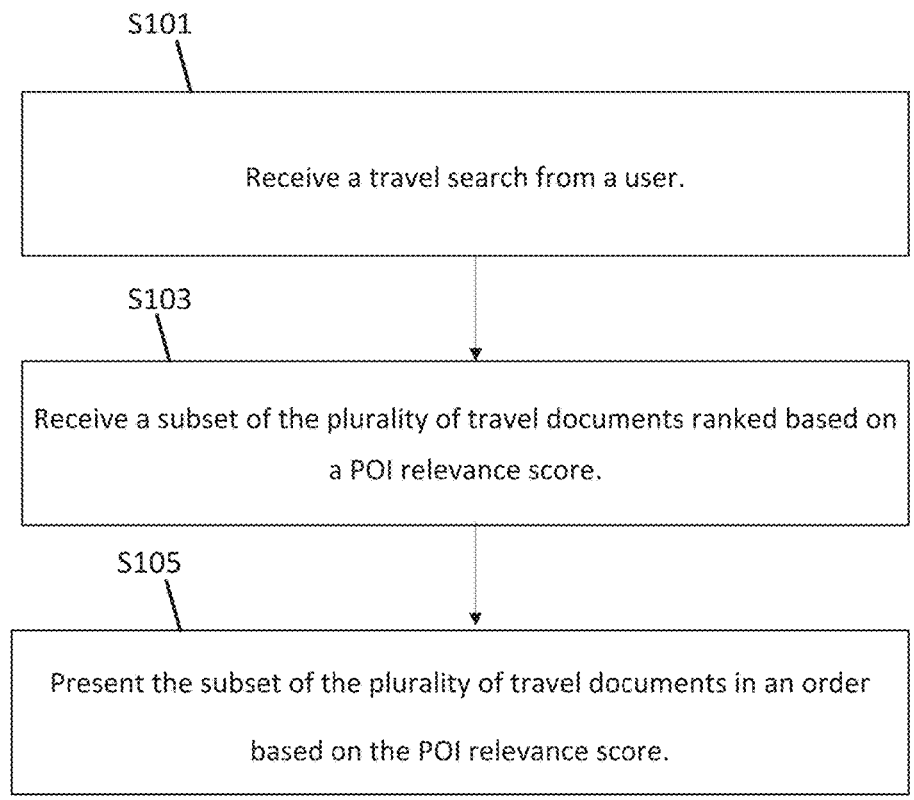
FIG. 11 illustrates an example flowchart for analyzing and search travel data.

FIG. 10 illustrates example mobile device 122 for the system of FIG. 1. The mobile device 122 includes a processor 200, a memory 204, an input device 203, a communication interface 205, position circuitry 207, and a display 211. Additional, different, or fewer components are possible for the mobile device/personal computer 122. The functions described above may be generally performed by processor 200, and instructions for the processor 200 may be stored in memory 204. The notifications may be stored in memory 204. FIG. 11 illustrates an example flowchart for searching travel data. Additional, different, or fewer components may be included.

At act S101, the processor 200 or the input device 203 is configured to receive a travel search from a user. The travel search may include a specific POI or class of POIs (e.g., restaurant, hotel, entertainment, or other attraction). The travel search may include a location (e.g., city, state, country, zip code, geographic coordinates, or other values). The travel search may include a qualifying term (e.g., family friendly, vegan, or 24 hour). The qualifying term may be in Boolean, free text, or natural language word or words entered by the user. The qualifying term may be selected from a set of predetermined qualifying terms.

In one example, the communication interface 205 sends the travel search to the server 125, which analyzes the travel search. In another example, the processor 200 analyzes the travel search. The processor 200 identifies a point of interest and a least one qualifying query from the travel search. Multiple factors may impact the identification of the POIs. The POIs may be identified based on the location in the travel search and the qualifying term in the travel search according to the examples above.

At act S105, the processor 200 or the communication interface 205 receives a subset of travel documents ranked based on a POI relevance score. The POI relevance score is based on how relevant the individual travel documents are to the POIs corresponding to the travel search and/or how likely the travel documents are dedicated to traveling related information.

At act S107, the processor 200 or the display 211 presents the subset of the travel documents in an order as ranked from the POI relevance score and based on the at least one qualifying query. In one example, the travel documents are ranked according to the POI relevance score. In another example, the travel documents are additionally or alternatively ranked based on a matching score indicative of a degree of match between the travel documents and the travel search.

Figure 12:
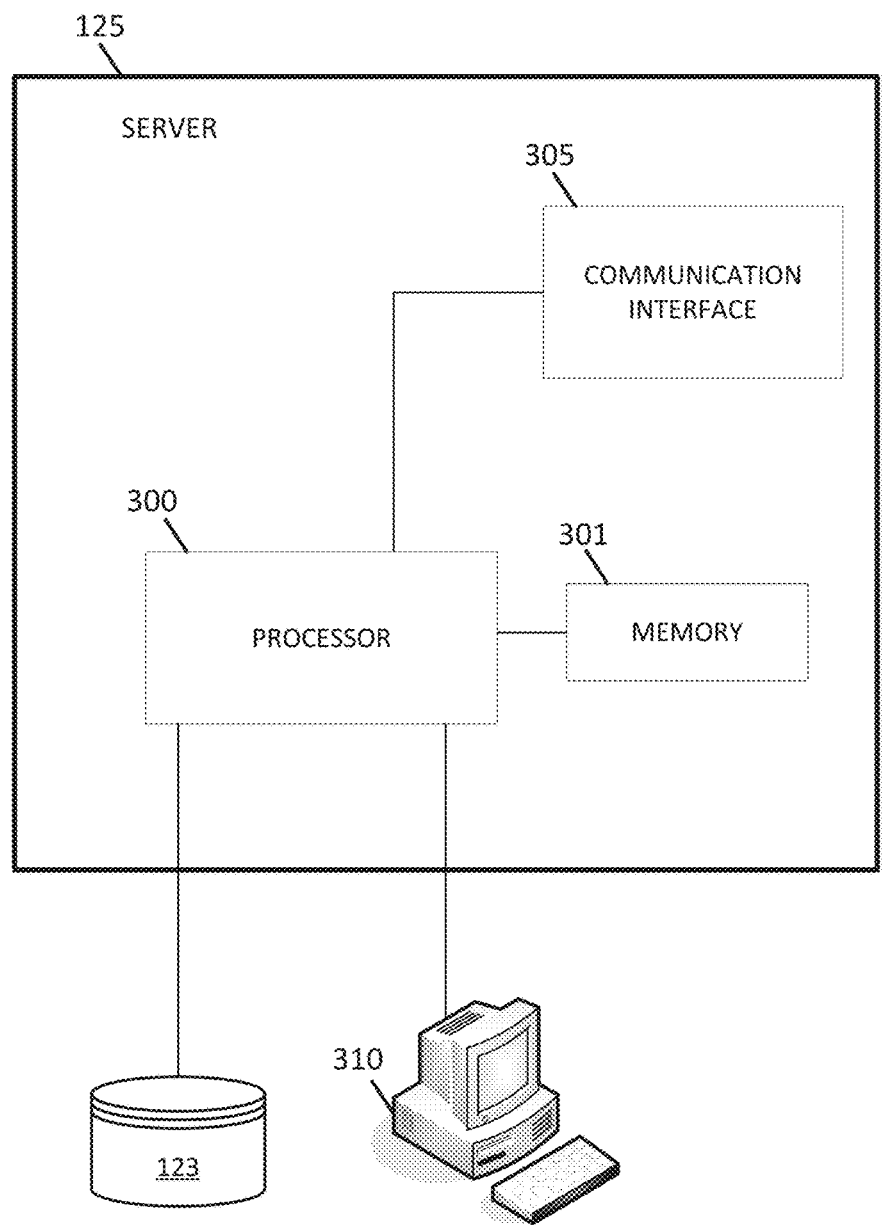
FIG. 12 illustrates an example network device of the system of FIG. 1.
Figure 13:
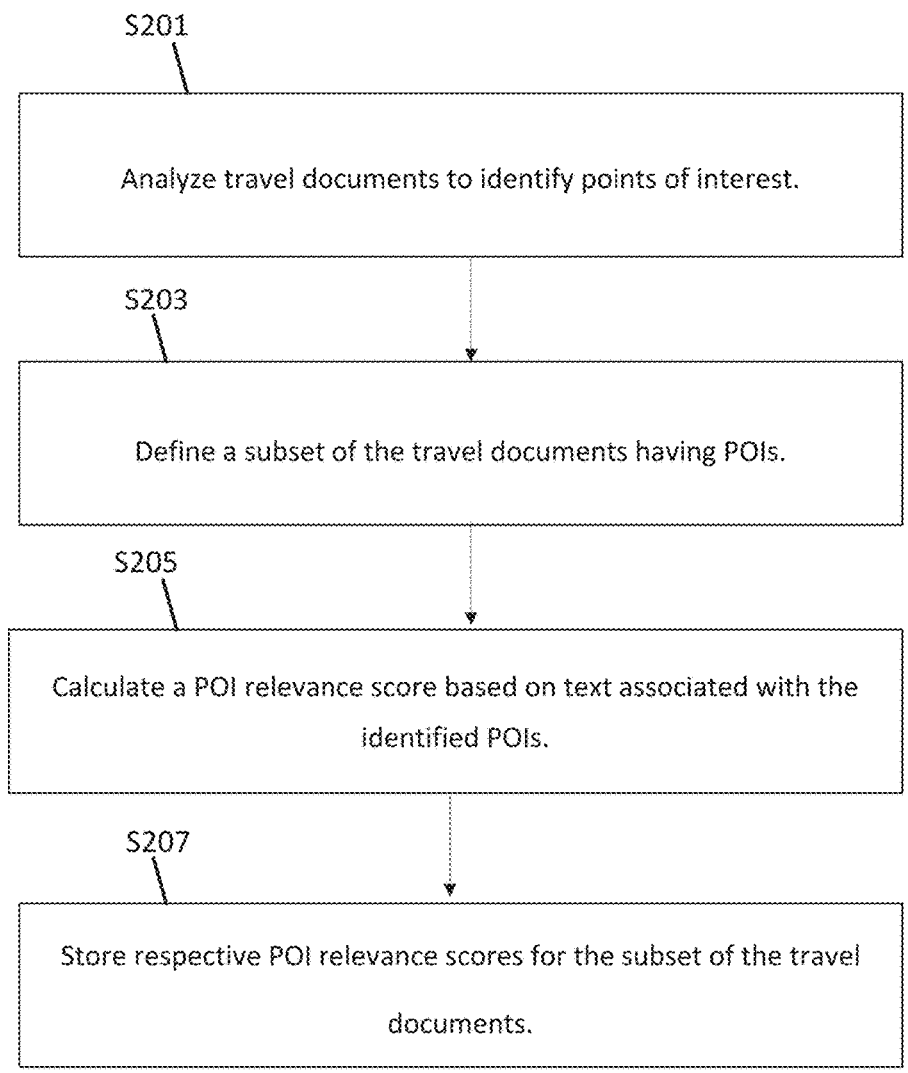
FIG. 13 illustrates an example flowchart for communicating near miss warnings.

FIG. 12 illustrates an example network device of the system of FIG. 1. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of user inputs made via the workstation 128 or the mobile device 122. FIG. 13 illustrates an example flowchart for the travel search. Different, fewer, or additional acts may be included.

At act S201, the processor 300 or communication interface 305 receives multiple travel documents. The travel documents may be stored in a private database or publicly available on the Internet. At act S203, the processor 300 is configured to identify POIs from the travel documents. The processor 300 may cross-reference a list of POI names or POI related terms in order to identify the POIs.

At act S205, the processor 300 is configured to further analyze the travel documents recognized in act S203 as including POI data. At act S207, the processor 300 is configured to calculate a POI relevance score based on text associated with the identified POIs. The POI relevance score indicates how likely the text is relevant to a travel search. Some features of a document may increase the POI relevance score. Example features that increase the POI relevance score include inclusion of the POI in the title, a quantity of instances of the POI or POI related terms higher than a predetermined number, and the source of the document is a known provider of travel related information. Some features of a document may decrease the POI relevance score. Example features that decrease the POI relevance score include the ambiguity of the POI mention in the document, a quantity of instances of the POI or POI related terms lower than a predetermined number, and the source of the document is not a provider of travel information (e.g., particular magazines, websites, or newspapers may focus on other topics rather than travel).

At act S207, the processor 300 may rank the travel documents based on the POI relevance score, a matching score, and or a qualifying term included in the travel search. The documents may be first ranked based on one score to eliminate some of the results. The remaining documents may be ranked on another score. The processor 300 may combine two or more of the scores to rank the documents. For example, the documents may be ranked based on a product of two or more of the POI relevance score, the matching score, and a qualifying term score.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The mobile device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The position circuitry 207 generates data indicative of the location of the mobile device 122. In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 122. The positioning system may also include a receiver and correlation chip to obtain a GPS signal.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The user can start in a number of ways. They can begin by being given a graphical representation of a starting template; by selecting an initial template to work with; or by starting to type and having the system suggest potential templates. This template is displayed as a mixture of fixed natural language and graphical elements for the dynamic parts of the template. The dynamic parts enable the user to explore possible completions (through some type of menu) or enter their own valid text. Thus, the user, when exposed to such a template, has the ability to formulate valid phrases, but, more importantly, to explore the variety of valid phrases and learn about the functionality of the underlying system.

Figure 14:
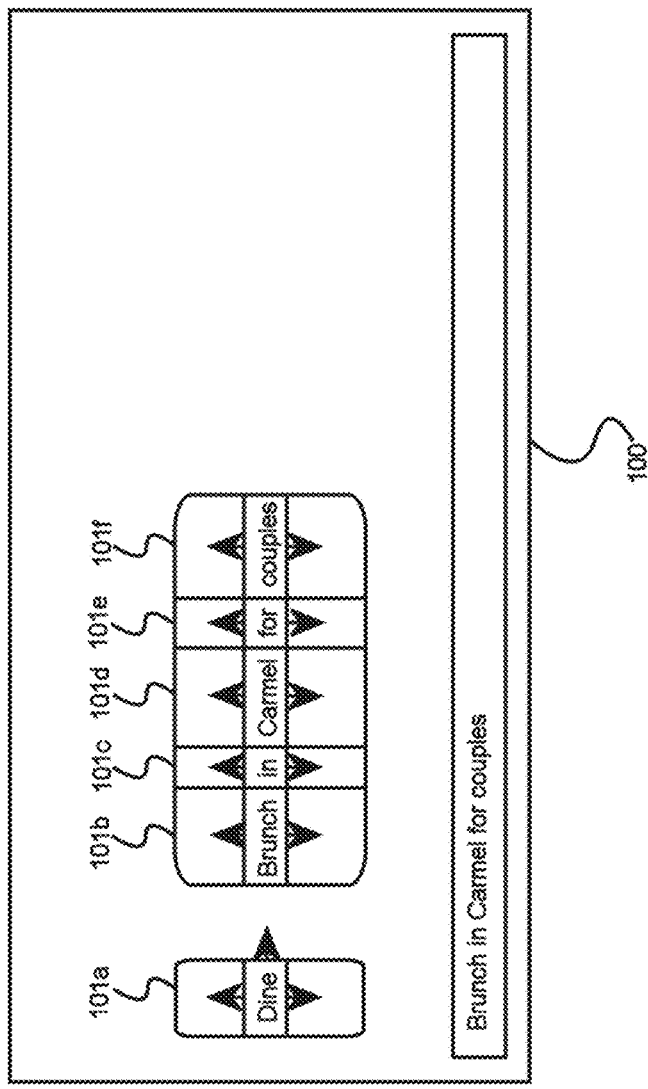
FIG. 14 illustrates is an illustration of an exemplary template field-based user interface, according to an embodiment.

FIG. 14 shows an exemplary fill-in-the-blank template 100, in which the user has fixed and dynamic elements to play with. Here the user can manipulate dialers 101a-101f to see the different options that fulfill this particular template and generate interesting natural language phrases that the system supports. The template approach allows a great deal of flexibility in the UI.

The fill-in-the-blank example shown in FIG. 14 indicates a fixed-structure template where only particular parts of the phrase may be changed, but the phrase always consists of five words with a general meaning. The use of more general templates, however, offers the user more expressiveness. Consider the phrase "Brunch in Carmel for couples" as constructed in FIG. 14. However, in a template with optional parts and additional parts, the user might opt to take off the "for couples" part of the phrase, allowing a more general search phrase, or the user could add "that is Italian" to the end of the phrase to narrow the meaning. From a user interface perspective all that is needed for this greater expressiveness are typical user interface elements to add and remove components (e.g., a "+" button that by which the system can suggest a longer template with more fields). Like the dynamic portions of the basic template, in these broader templates the addition of new components can also be done with something that displays the available options to the user and enables them to play and interact. For example, the user might toggle between different template addition options and visually see how it changes the phrase and its possibilities. In addition, the underlying logic of the template might be such that the user changing a UI element would cause additional elements be added and removed. For example, consider a template that can generate the phrase "A Hotel in Santa Cruz near the beach." If the user through the UI changes "Santa Cruz" to "Las Vegas" the template might change to remove the "near the beach" option of the phrase, and optionally it may add new phrase completion options such as "on the Strip." Note that these changes can happen at any part of the template; that is, a user change anywhere can affect the structure and content of any other parts of the template. Thus, by manipulating the UI the user controls two types of aspects: 1) the template, which implies which fields and UI elements are available, 2) the values, which may be selected by the user for each field.

As described above, in a fixed template the UI is directly implied from the template. However, as mentioned above, templates can be dynamic and take into account other considerations as well. At every stage in this interaction, the template, its content and how its content is ordered and prioritized may be built using a combination of factors. For instance, a search based on categories and attributes may include these factors:

A pre-existing category or attribute structure such as, for example, a list of categories of attractions and their features that is based on a semantic domain model (for instance an ontology) of the search data.

Contextual information such as the location, weather, current and previous activities of the user, current trending activities of other users in the same location, and more. These data can be used alongside a set of rules and/or statistical data about how they apply to the categories and features. An example rule may be "if it's snowing, ski is more relevant." These rules can apply to the suggested elements of the template.

User profile information, such as user preferences, search history, and social graph, which may be used to assess the probability of interest in a category or feature. Example information may include such data as "the user's friends like skiing; show ski first." Any such prioritization approach can employ user information that the system believes is most likely to generate a user response or realize a greater profit.

Actual search database content to assess the availability and desirability of results under possible templates in real time and suggest elements of templates that produce meaningful and/or diverse and/or interesting results. A simple example: if no attractions are available at a selected location, avoid suggesting that the user search for attractions by not suggesting "attractions" as a template element.

The context may also be external criteria. For example, certain items may be emphasized because they are part of a sponsorship/advertising campaign or because internally the system is trying to gather statistics and purposely varying items to gather useful interaction statistics.

The UI template mechanism can also be made broader. While the user interface described above is based on individual templates, the system typically has language that is spanned by different templates or language formalisms. The above user interface can also be expanded to enable the user to "move" between templates. Take the above example of FIG. 14 again: "Brunch in Carmel for couples." The system could be designed such that the user may switch the word "Brunch" for "Motel." In this case there may be an overlap at the end of the sentence between a template for dining and a template for accommodations. By changing that word the system implicitly would change the template in which the user is working to another one. In broad terms the UI can also encapsulate mappings between templates. If the syntactic relationship between templates is known, then the UI could be designed so that by changing, adding, deleting, or choosing elements the user can move from template to template and explore more and more of the functionality of the system, while consistently generating valid language.

In addition, all the UI elements may sit in a type of text box. The user may be able to manipulate the UI elements as described above and in addition the user can manually edit text surrounding the elements or replace elements with the user's own text. In this case, as the user types if the system recognizes that what the user has created is part of a valid template it can transform the typed text into the relevant UI for that template, enabling the user to naturally augment and modify the phrase using the abilities listed previously. The user can then choose to manipulate the UI or do further typing to get other results.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 26:
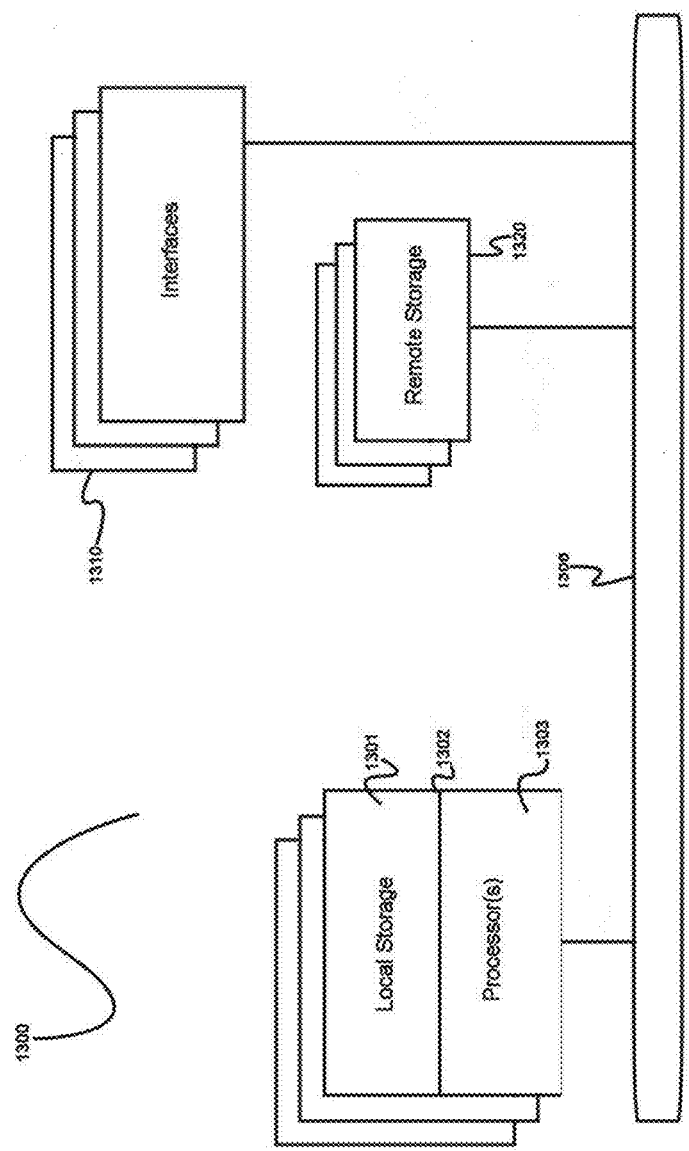
FIG. 26 is a block diagram illustrating an exemplary hardware architecture of a computing device used in an embodiment.

Referring now to FIG. 26, there is shown a block diagram depicting an exemplary computing device 1300 suitable for implementing at least a portion of the features or functionalities disclosed herein. Computing device 1300 may be, for example, any one of the computing machines listed in the previous paragraph, or indeed any other electronic device capable of executing software- or hardware-based instructions according to one or more programs stored in memory. Computing device 1300 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1300 includes one or more central processing units (CPU) 1302, one or more interfaces 1310, and one or more busses 1306 (such as a peripheral component interconnect (PCI) bus). When acting under the control of appropriate software or firmware, CPU 1302 may be responsible for implementing specific functions associated with the functions of a specifically configured computing device or machine. For example, in at least one embodiment, a computing device 1300 may be configured or designed to function as a server system utilizing CPU 1302, local memory 1301 and/or remote memory 1320, and interface(s) 1310. In at least one embodiment, CPU 1302 may be caused to perform one or more of the different types of functions and/or operations under the control of software modules or components, which for example, may include an operating system and any appropriate applications software, drivers, and the like.

CPU 1302 may include one or more processors 1303 such as, for example, a processor from one of the Intel, ARM, Qualcomm, and AMD families of microprocessors. In some embodiments, processors 1303 may include specially designed hardware such as application-specific integrated circuits (ASICs), electrically erasable programmable read-only memories (EEPROMs), field-programmable gate arrays (FPGAs), and so forth, for controlling operations of computing device 1300. In a specific embodiment, a local memory 1301 (such as non-volatile random access memory (RAM) and/or read-only memory (ROM), including for example one or more levels of cached memory) may also form part of CPU 1302. However, there are many different ways in which memory may be coupled to system 1300. Memory 1301 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 1310 are provided as network interface cards (NICs). Generally, NICs control the sending and receiving of data packets over a computer network; other types of interfaces 1310 may for example support other peripherals used with computing device 1300. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 26 illustrates one specific architecture for a computing device 1300 for implementing one or more of the embodiments described herein, it is by no means the only device architecture on which at least a portion of the features and techniques described herein may be implemented. For example, architectures having one or any number of processors 1303 may be used, and such processors 1303 may be present in a single device or distributed among any number of devices. In one embodiment, a single processor 1303 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 1320 and local memory 1301) configured to store data, program instructions for the general-purpose network operations, or other information relating to the functionality of the embodiments described herein (or any combinations of the above). Program instructions may control execution of or comprise an operating system and/or one or more applications, for example. Memory 1320 or memories 1301, 1320 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 27:
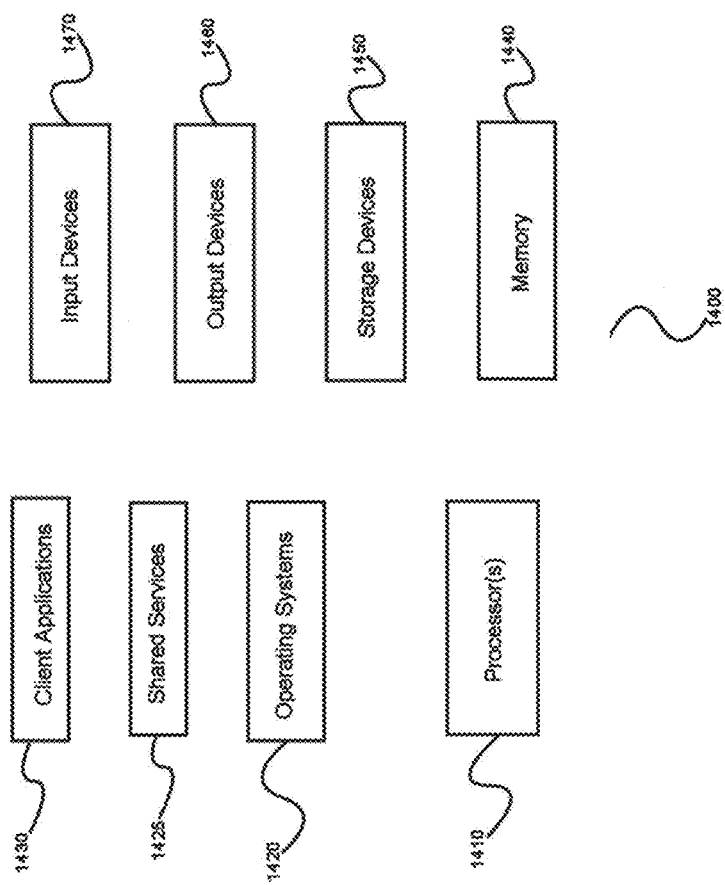
FIG. 27 is a block diagram illustrating an exemplary logical architecture for a client device, according to an embodiment.
Figure 28:
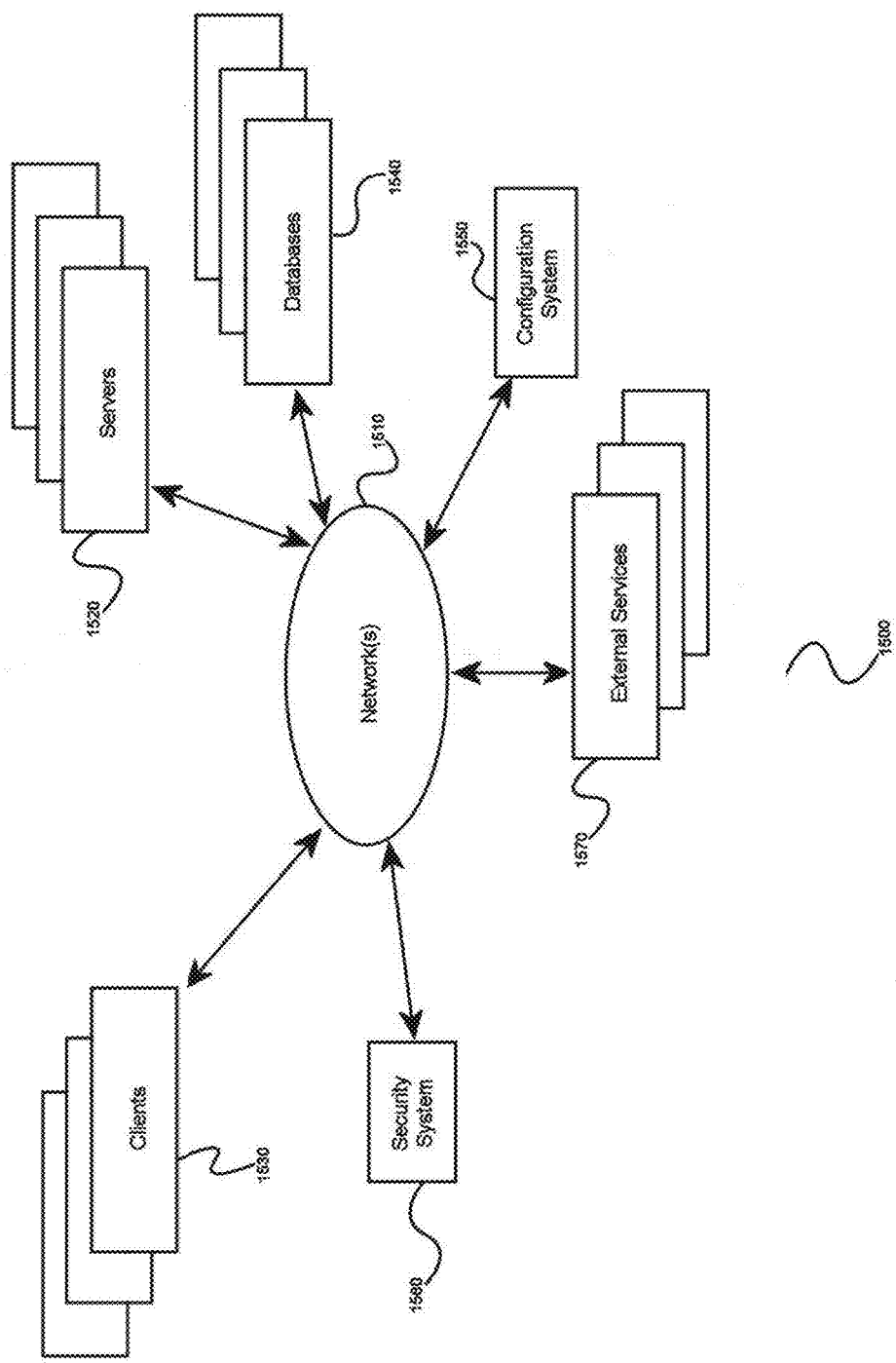
FIG. 28 is a block diagram showing an exemplary architectural arrangement of clients, servers, and external services, according to an embodiment.

In some embodiments, systems may be implemented on a standalone computing system. Referring now to FIG. 27, there is shown a block diagram depicting a typical exemplary architecture of one or more embodiments or components thereof on a standalone computing system. Computing device 1400 includes processors 1410 that may run software that carry out one or more functions or applications of embodiments, such as for example a client application 1430. Processors 1410 may carry out computing instructions under control of an operating system 1420 such as, for example, a version of Microsoft's Windows operating system, Apple's Mac OS/X or iOS operating systems, some variety of the Linux operating system, Google's Android operating system, or the like. In many cases, one or more shared services 1425 may be operable in system 1400, and may be useful for providing common services to client applications 1430. Services 1425 may for example be Windows services, user-space common services in a Linux environment, or any other type of common service architecture used with operating system 1410. Input devices 1470 may be of any type suitable for receiving user input, including for example a keyboard, touchscreen, microphone (for example, for voice input), mouse, touchpad, trackball, or any combination thereof. Output devices 1460 may be of any type suitable for providing output to one or more users, whether remote or local to system 1400, and may include for example one or more screens for visual output, speakers, printers, or any combination thereof. Memory 1440 may be random-access memory having any structure and architecture known in the art, for use by processors 1410, for example to run software. Storage devices 1450 may be any magnetic, optical, mechanical, memristor, or electrical storage device for storage of data in digital form. Examples of storage devices 1450 include flash memory, magnetic hard drive, CD-ROM, and/or the like.

In some embodiments, systems may be implemented on a distributed computing network, such as one having any number of clients and/or servers. Referring now to FIG. 15, there is shown a block diagram depicting an exemplary architecture 1500 for implementing at least a portion of a system according to an embodiment on a distributed computing network. According to the embodiment, any number of clients 1530 may be provided. Each client 1530 may run software for implementing client-side portions; clients may comprise a system 1500 such as that illustrated in FIG. 14. In addition, any number of servers 1520 may be provided for handling requests received from one or more clients 1530. Clients 1530 and servers 1520 may communicate with one another via one or more electronic networks 1510, which may be in various embodiments any of the Internet, a wide area network, a mobile telephony network, a wireless network (such as WiFi, Wimax, and so forth), or a local area network (or indeed any network topology known in the art; with no preference for any one network topology over any other). Networks 1510 may be implemented using any known network protocols, including for example wired and/or wireless protocols.

In addition, in some embodiments, servers 1520 may call external services 1570 when needed to obtain additional information, or to refer to additional data concerning a particular call. Communications with external services 1570 may take place, for example, via one or more networks 1510. In various embodiments, external services 1570 may comprise web-enabled services or functionality related to or installed on the hardware device itself. For example, in an embodiment where client applications 1430 are implemented on a smartphone or other electronic device, client applications 1430 may obtain information stored in a server system 1520 in the cloud or on an external service 1570 deployed on one or more of a particular enterprise's or user's premises.

In some embodiments, clients 1530 or servers 1520 (or both) may make use of one or more specialized services or appliances that may be deployed locally or remotely across one or more networks 1510. For example, one or more databases 1540 may be used or referred to by one or more embodiments. It should be understood by one having ordinary skill in the art that databases 1540 may be arranged in a wide variety of architectures and using a wide variety of data access and manipulation means. For example, in various embodiments one or more databases 1540 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 1560 and configuration systems 1550. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 1560 or configuration system 1550 or approach is specifically required by the description of any specific embodiment.

Figure 29:
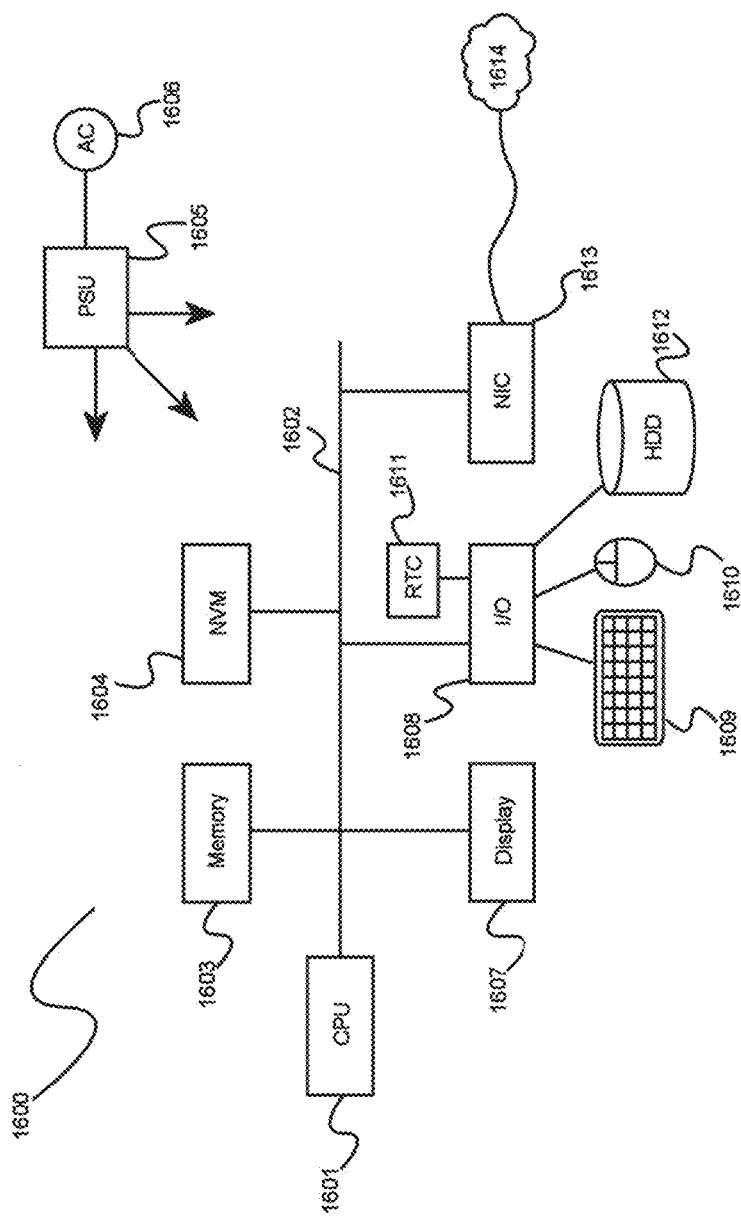
FIG. 29 is another block diagram illustrating an exemplary hardware architecture of a computing device used in various embodiments.

FIG. 29 shows an exemplary overview of a computer system 1600 as may be used in any of the various locations throughout the system. It is exemplary of any computer that may execute code to process data. Various modifications and changes may be made to computer system 1600 without departing from the broader spirit and scope of the system and method disclosed herein. CPU 1601 is connected to bus 1602, to which bus is also connected memory 1603, non-volatile memory 1604, display 1607, I/O unit 1608, and network interface card (NIC) 1613. I/O unit 1608 may, typically, be connected to keyboard 1609, pointing device 1610, hard disk 1612, and real-time clock 1611. NIC 1613 connects to network 1614, which may be the Internet or a local network, which local network may or may not have connections to the Internet. Also shown as part of system 1600 is power supply unit 1605 connected, in this example, to ac supply 1606. Not shown are batteries that could be present, and many other devices and modifications that are well known but are not applicable to the specific novel functions of the current system and method disclosed herein.

Conceptual Architecture

FIG. 14 shows an exemplary fill-in-the-blank template 100, in which the user has fixed and dynamic elements to play with. Here the user can manipulate dialers 101*a*-101*f* to see the different options that fulfill this particular template and generate interesting natural language phrases that the system supports. The template approach allows a great deal of flexibility in the UI.

The fill-in-the-blank example shown in FIG. 14 indicates a fixed-structure template where only particular parts of the phrase may be changed, but the phrase always consists of five words with a general meaning. The use of more general templates, however, offers the user more expressiveness. Consider the phrase "Brunch in Carmel for couples" as constructed in FIG. 14. However, in a template with optional parts and additional parts, the user might opt to take off the "for couples" part of the phrase, allowing a more general search phrase, or the user could add "that is Italian" to the end of the phrase to narrow the meaning. From a user interface perspective all that is needed for this greater expressiveness are typical user interface elements to add and remove components (e.g., a "+" button that by which the system can suggest a longer template with more fields). Like the dynamic portions of the basic template, in these broader templates the addition of new components can also be done with something that displays the available options to the user and enables them to play and interact. For example, the user might toggle between different template addition options and visually see how it changes the phrase and its possibilities. In addition, the underlying logic of the template might be such that the user changing a UI element would cause additional elements be added and removed. For example, consider a template that can generate the phrase "A Hotel in Santa Cruz near the beach." If the user through the UI changes "Santa Cruz" to "Las Vegas" the template might change to remove the "near the beach" option of the phrase, and optionally it may add new phrase completion options such as "on the Strip." Note that these changes can happen at any part of the template; that is, a user change anywhere can affect the structure and content of any other parts of the template. Thus, by manipulating the UI the user controls two types of aspects: 1) the template, which implies which fields and UI elements are available, 2) the values, which may be selected by the user for each field.

DETAILED DESCRIPTION OF EXEMPLARY EMBODIMENTS

Following are a few examples of how the system disclosed herein may be embodied. These are only examples and do not limit the scope of the disclosed embodiment in any way.

Textual Representation. This is one of the simplest implementations, which just uses a search box. As the user is entering/editing text (e.g., using a keyboard or speech), they are presented with suggestions, and the user can select them to be added/replace the text entered. Unlike auto complete that just suggests completions here the suggestions are based on templates and can even replace what was entered. The system notices the templates of which the user's text can be partial manifestations and suggests possible complete phrases, using the templates.

FIGS. 15a and 15b show examples of user-modified templates. In template 200, a portion of which is shown in FIG. 15a, the user is starting to type "Hotel" 203 into template field 201. The system identifies use of a template that starts with Hotel and decides to offer in field 202 phrase completions 204a-n where the next feature that may be interesting is the location, suggesting various options for specific/non-specific locations:

FIG. 15b shows an additional stage in template 200, wherein the user has filled in field 201 with text "Hotel in San Jose" 205. The system may then decide to look at a broader template context and to suggest a theme, or even suggest specific search results that are relevant or otherwise interesting, in list 206 in field 202.

Figure 16A:
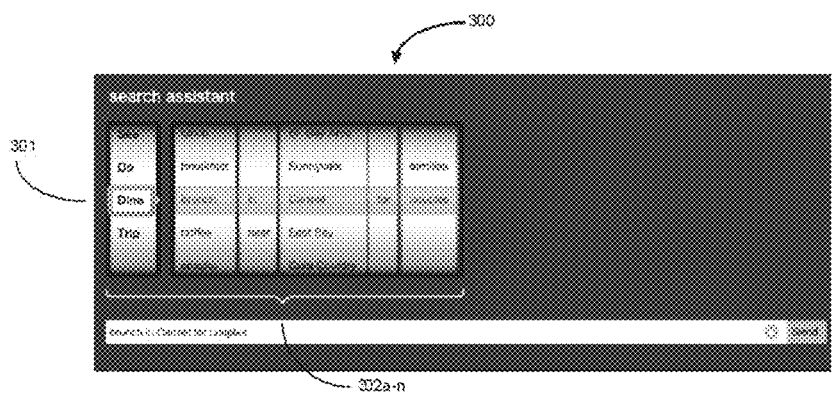
FIGS. 16A, 16B, and 16C are an illustration of a variety of exemplary field-based user interfaces.
Figure 16B:
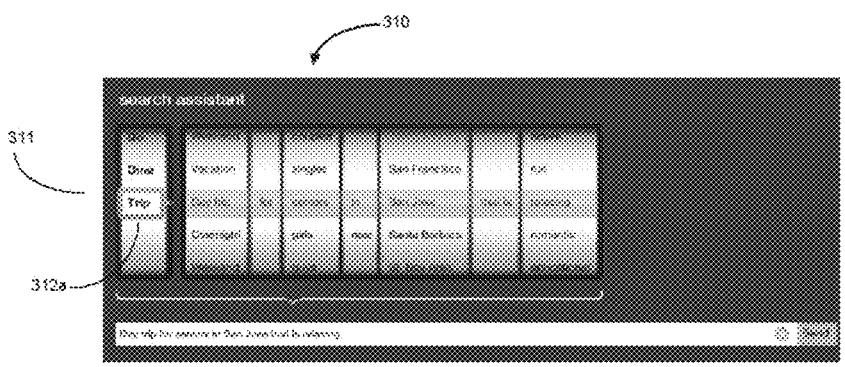
Figure 16C:
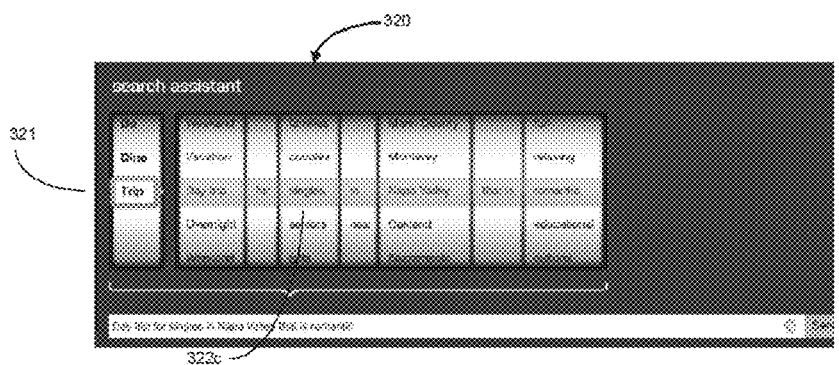

Visual Dialers. FIGS. 16a, 16b, and 16c show a user interface design that is more effective for touch screens and demonstrates more clearly how the UI informs the user succinctly of the options available. A row of visual "dialer menus" is arranged on the screen as per a template or group of templates. These dialer menus can be manipulated individually. The dialers are used to create phrases or sentences. Selection of a value for a dialer or set of dialers may reset the number and contents of dialers whose value has not yet been set by the user to relevant attributes. Setting the value of dialers may also create a textual phrase or query in a search field.

FIG. 16a shows an exemplary dialer 300 with a query entered in a search field 301, which search field contains categories 302. FIG. 16b shows an exemplary dialer 310. Changing the first category 312a in search field 311 results in changes in the following categories 312. FIG. 16c shows an exemplary dialer 320. In this case, changing the third category 322c in results in suggestions of different locations and themes search field 321.

Template Classification

A number of templates can be managed by the software, such that when the user starts interacting—by typing, selecting or speaking—the system classifies the keywords entered by field type, and this way chooses the template the user is following. This approach enables the system to guide the user to phrase his query according to the chosen template. Such guidance can be provided through an "Auto-suggest" mechanism whereby possible field values that match the field type are suggested in a drop-down menu or similar UI widget or through visual or textual cues. For instance, consider an example where there are two templates—one for accommodations search, one for activity search. The Accommodations template could be: <type> in <location> on <dates> for <guests>—e.g., "luxury hotel in New York City on June 1-3 for 2 people." The Activities template could be <type> in <location> featuring <feature>. When a user starts typing, the system could cue the user to enter a type first, by displaying a prompt, such as "What type of place are you looking for?" and auto-suggesting a few places types, such as, for example, "hotel, tour, cruise." Auto-suggestions may be based on the actual content of the result database, statistical history of user queries, known location or intent of the user, etc. If the user enters or selects "motel," for instance, the system understands the Accommodations template should be used and then asks for a location and then for dates. If the user enters "massage," the system asks for location and then for additional features.

Figure 17:
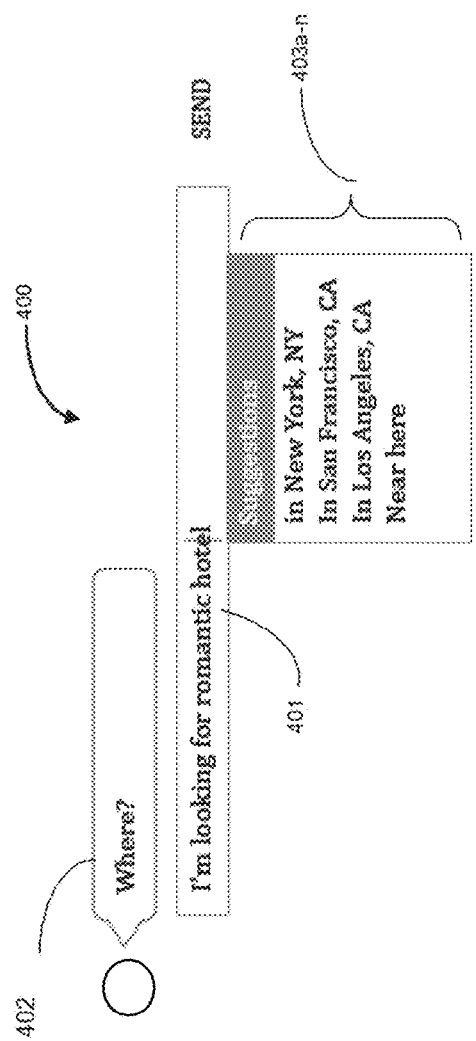
FIG. 17 is an illustration of an exemplary user interface illustrating the system suggesting information based on input cues.

FIG. 17 shows and exemplary user interface 400 in which the system gives a cue and makes suggestions for a location. The user expressed a <type> 401 he is interested in ("romantic hotel") and the system is soliciting the <location>, with both a textual cue 402 ("where?") and auto-suggestions 403.

Such a system could manage many templates through a tree-structure or state machine. It could also include logic for handling inconsistencies, such as when a user does not respond to a specific template cue with matching text. For example, if the user is asked for <guests> and instead types in an amenity he is interested in, the system could understand that as a <feature> field, remember it for a subsequent template field, and ask again about the detail that it's missing. Alternatively the system could choose an alternate template that does include a <feature> field at this stage, etc.

A specific complication exists with fields that are quantitative, such as dates. It is generally easier and less error prone to pick dates from a calendar than enter them using natural language. In a template-driven system, when the system reaches such a field, then instead of just providing a textual cue and/or a list of suggestions, the system could automatically display a visual widget that easily enables the user to pick the quantitative value such as, for example, a calendar widget for dates, a slider widget for prices or distances (perhaps with additional information such as the distribution of prices for rooms in the destination city), etc. Such widgets can also be incorporated in a speech-driven system, so that when the system detects that the user has reached a point in the template where such a value needs to be entered, the visual menu or widget is displayed, and the user may select from the widget instead of speaking the specific quantities, numbers, dates etc.

Figure 18:
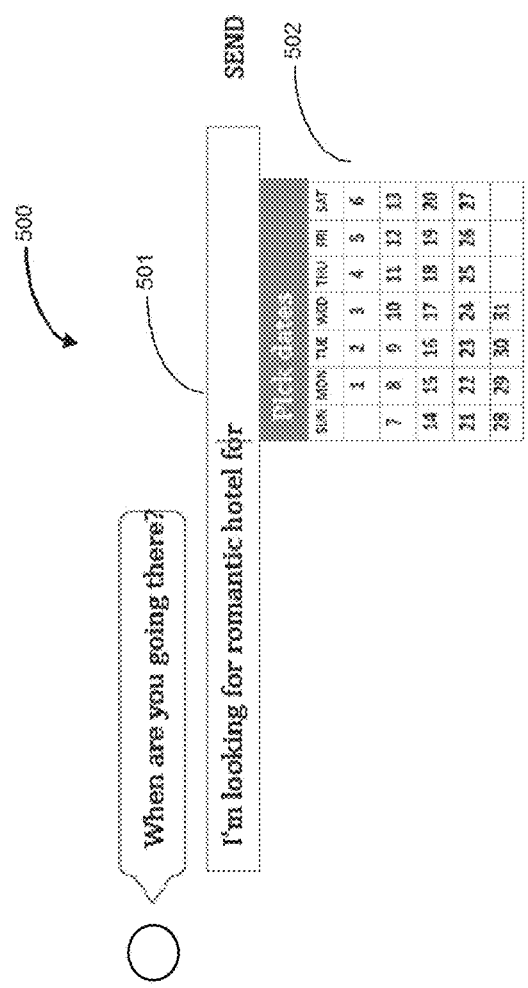
FIG. 18 is a further illustration of an exemplary user interface, illustrating the system soliciting a date entry based on input cues.

FIG. 18 shows an exemplary user interface 500 in which the system is soliciting a date entry to complete the data in text field 501 by displaying a calendar widget 502.

Figure 19:
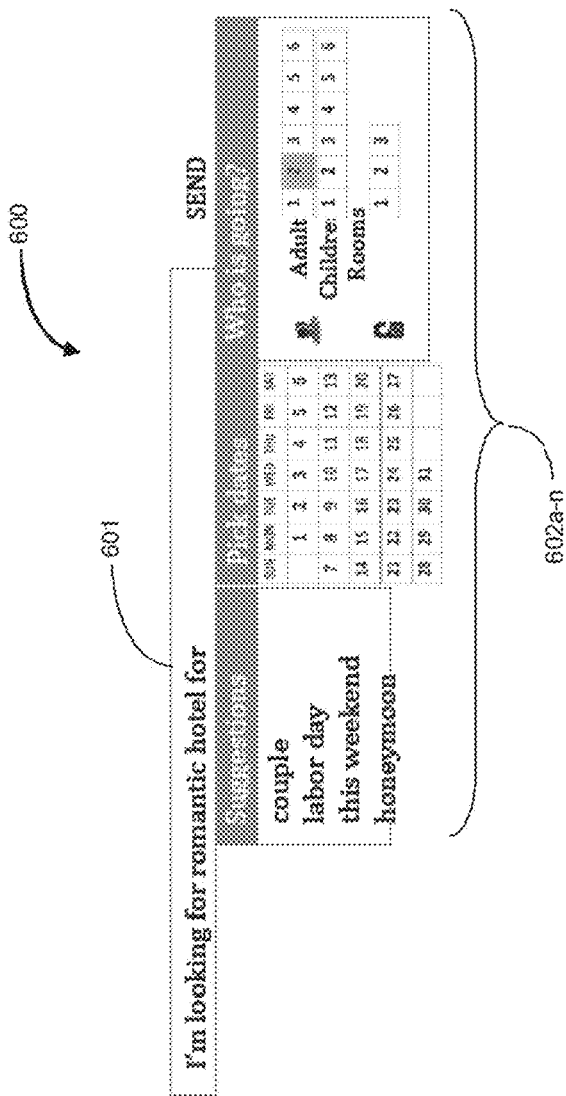
FIG. 19 is an illustration of an exemplary user interface illustrating the use of multiple widgets and menus.

Such auto-suggest and quantitative widget-based entry can be used even in the absence of templates, or when the text entered does not match the templates. FIG. 19 shows an exemplary user interface 600 wherein multiple menus and/or widgets 602 may be displayed when the user's entry seems ambiguous to the system. In this case, the system may use reference words supplied by the user. If the user supplies reference words such as "for," "on," "in," etc., the system can then respond by narrowing down the semantic type of information that the user wishes to express next. For example, in a travel context, if the user types "for," in field 601, the type of data the user may wish to follow this reference word may be any of multiple data types, such as people, dates, or a named time span, e.g., "for a family," "for September 10-12," "for Thanksgiving weekend," etc. Therefore such a reference term can be a trigger for the system to display menus and widgets 602 that enable quick selection of the item desired by the user.

Figure 20:
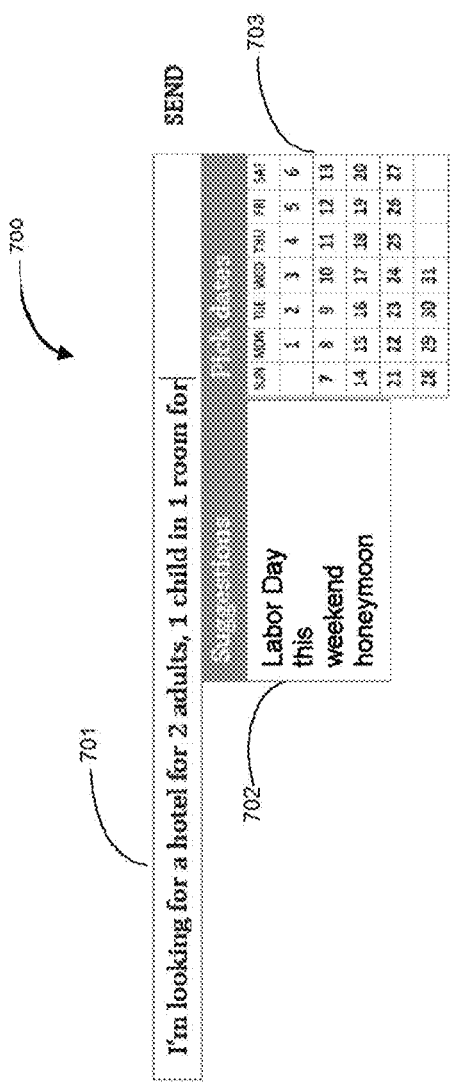
FIG. 20 is a further illustration of an exemplary user interface, illustrating the use of input recognition to reduce repeated entries.

It is also easily understood that such ambiguity can be further reduced through the information already entered by the user, such that if one the fields was already entered, it needn't be suggested again. FIG. 20 shows an exemplary user interface 700. In this example, the first use of the reference word "for" is followed by an accommodation type. Therefore, fewer widgets appear in response to the use of the second "for." In this case, the system offers the user a type-of-occasion menu 702 and a calendar 703.

Figure 21:
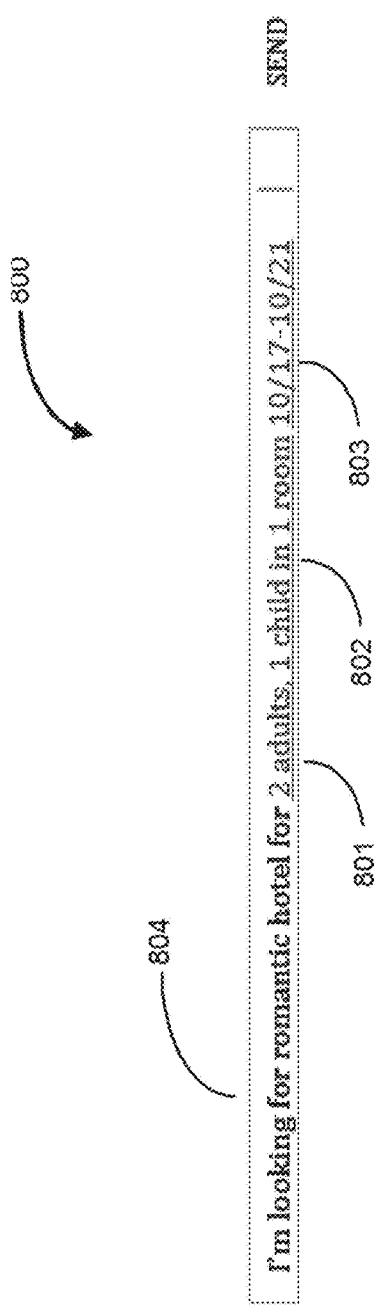
FIG. 21 is a further illustration of an exemplary user interface, illustrating the use of separate interactive tokens.

One way to enable the user to easily change entries could be to annotate the query string itself, such that clicking a specific token re-opens the widget that was used to pick or enter it. FIG. 21 shows an exemplary user interface 800, wherein clicking each of the separately underlined tokens 801, 802, or 803 in field 804 would open the appropriate data entry widget (not shown).

Figures 22A, 22B:
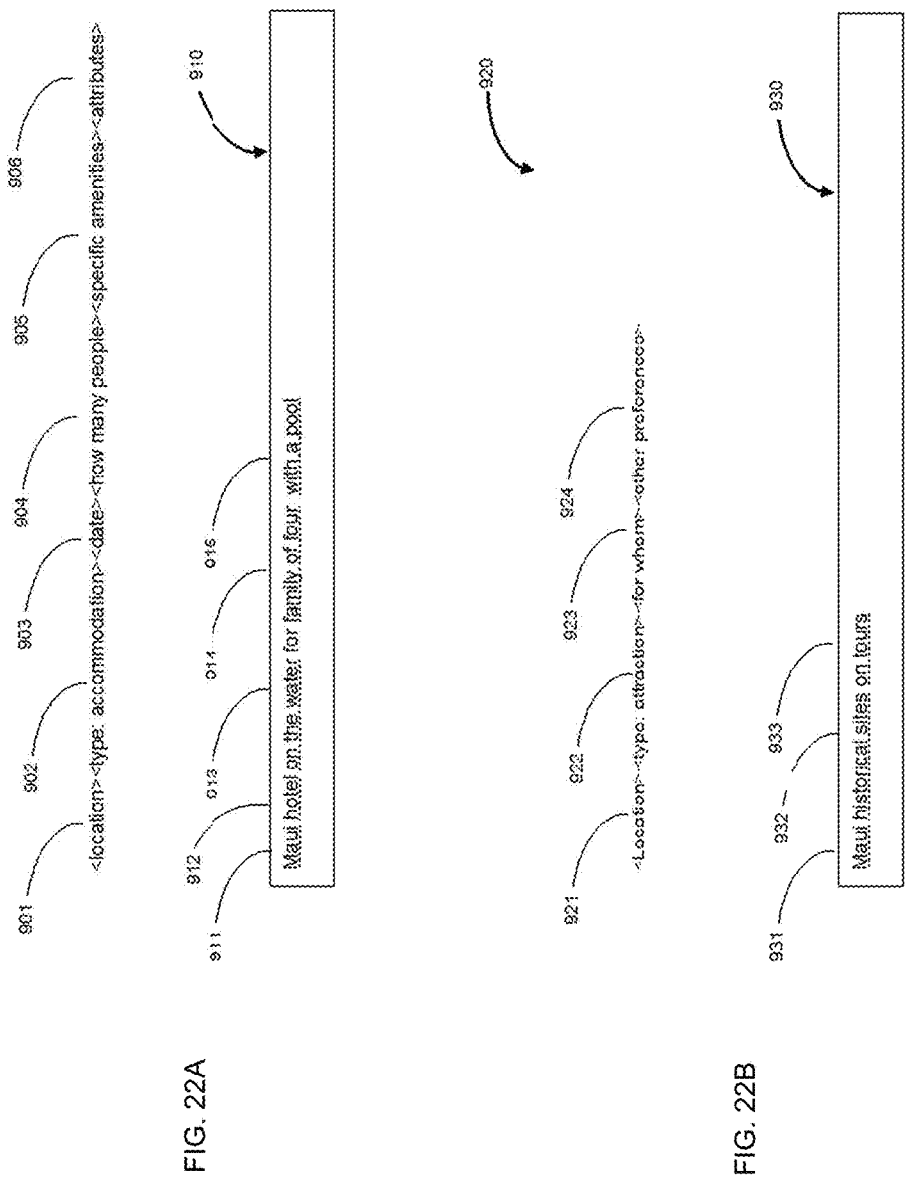
FIGS. 22A and 22B illustrate an exemplary overview of a template, with a variety of sample input illustrated.

FIG. 22a shows an exemplary overview of a template 900 with a typical query for a hotel or other destination search. Template 900 contains, in this example, a location 901, type of what the user wants, which is, in this example, an accommodation 902. Other types of what the user wants could be, for example, a landmark, an historical site, etc. A date or date range 903 is included, and then the how many people 904, which may be broken down into adults, children, pets, people with special needs, etc., as shown later. Specific amenities 905, such as, for example, on the beach, with a pool, with golfing privileges, etc. may be included, and also additional attributes 906, which have not been properly planned but may be added by the user ad lib. Box 910 shows an exemplary fill-in by the user. The location is Maui 911; what the user wants is a hotel 912, with on the water 913 an attribute of the hotel. The number of people is a family of four 914 and an amenity is with a pool 915. In this example, the template has been slightly modified on the fly; for example, the date has not yet been entered, and an attribute to the hotel, on the water 912, has been added. Also, certain sections have a dotted underline to indicate to the user that these are interactive sections and when the pointer is placed in a section, user can modify the text in that section.

FIG. 22b shows a similar exemplary template 920, in this case, an exemplary template for an attraction. When the user starts typing in window 930 "Maui historical site," the window changes from template 900 to template 920, because a historical site is a type of attraction, rather than a type of accommodation, and it has a different template. However, the user has the ability to make a free-style entry with different words than the words in the template 920.

Figure 23:
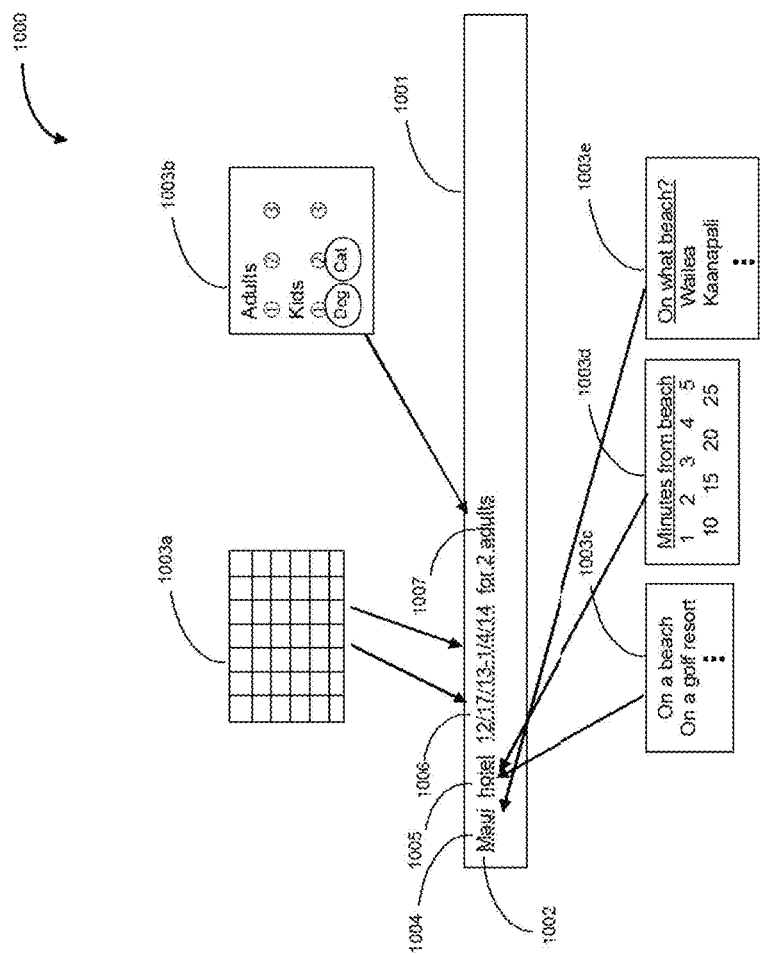
FIG. 23 illustrates an illustration of an exemplary user interaction system when a user is making a query.

FIG. 23 shows an exemplary user interaction system 1000 when a user is making a query 1002 in a box 1001. The query shows, for example, "Maui" 1004 "hotel" 1005. Now when the user specifies "Maui hotel," a widget 1003e can pop up, asking about the desired area or beach and offering suggestions, such as Wailea, Kaanapali, etc. Another attribute widget 1003c may open at the same time, or consequently, offering attributes such as on a beach, on a golf resort, in the mountains, etc. Further, if the user selects, for example, "on a beach," another attribute widget 1003d may pop up, asking for the desired walking time from the beach. Once the user reaches the date section 1006 of the template, a calendar widget 1003a opens in which the user can specify the start and end dates 1006 of the stay. When the user enters "for", or alternatively immediately after the user entered the dates, widget 1003b may pop up, giving the user options to specify the number and characteristics of the occupants, such as, for example, number of adults, number of children, pets (dog, cat), etc, which the user can pick for instance "2 adults" which will add the token 1007 to the sentence. In this way the system can automatically narrow its offerings to accommodations that can satisfy the user's requirements.

The details of the user interaction system 1000 shown in FIG. 10 are exemplary only. Depending on the size of the screen of the device used to enter the query, that is, mobile phone, tablet, PC, etc., the number of widgets that may open simultaneously may be restricted, or the system may offer a small toolbar or a set of tabs, for example, from which the user can select desired widgets or functions for interaction. Many such approaches may be devised, such as, for example, depending on the tab a user selects, a widget opens showing to which sets of words it is linked, by, for example, highlighting linked words in a specific contrasting color. The user can always select a section in a template and, instead of using the options shown in a pop-up widget, the user can type in his own preferences. The widgets are designed to implement an auto-suggestion approach, instead of an auto-complete approach. In auto-complete, as the user types, the text widget that drops down can complete what the user is typing, or can show the user what other people have typed to complete the given section. However, in this case, for example, when the user types a word, such as "hotel," the attribute widget 1003c may pop up, prompting the user to express an attribute preference.

Figure 24:
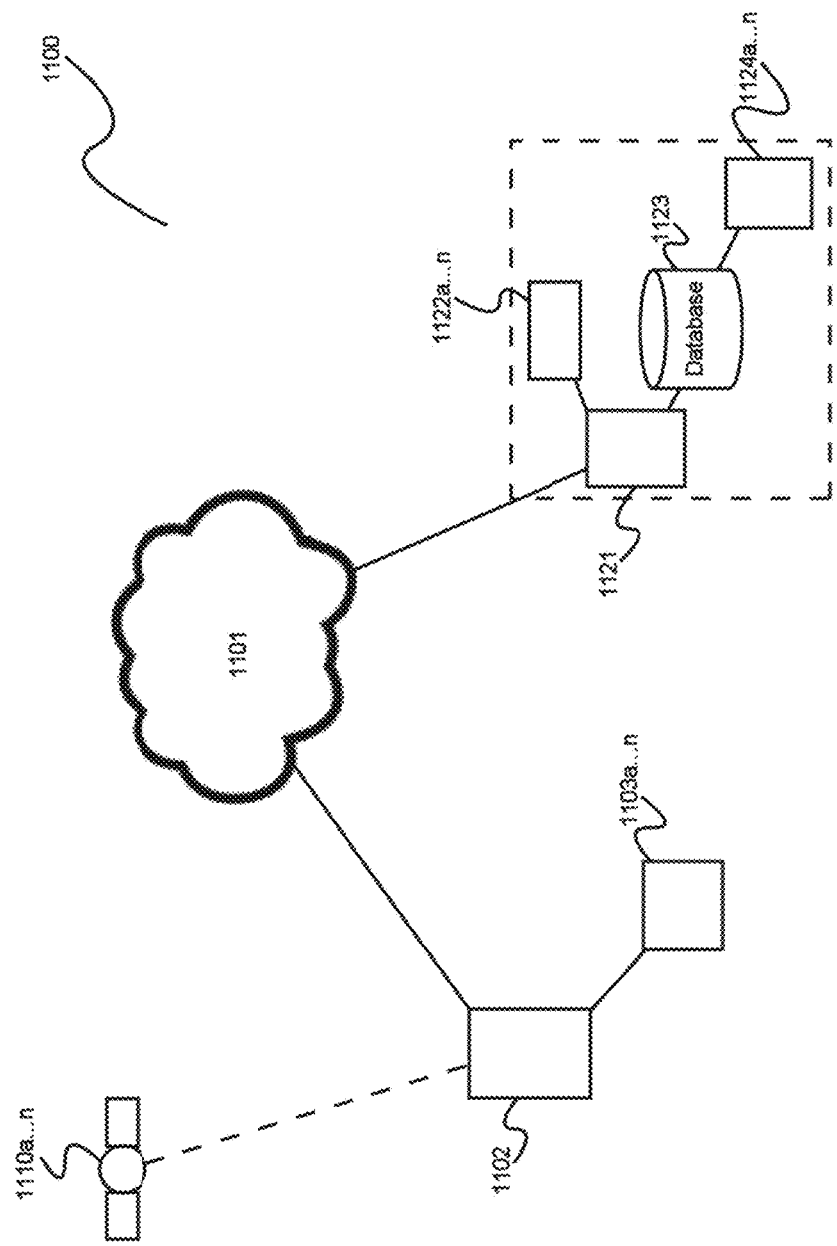
FIG. 24 is an illustration of an overview of an exemplary system according to a preferred embodiment.

FIG. 24 shows an overview of an exemplary system 1100 according to one aspect of the system and method disclosed herein. Internet 1101 is exemplary of any type of network; any other type of network could be used. Also shown is a mobile computing device 1102, which device could be a tablet, a phone, a cross-over device, a mobile computer, etc. This device 1102 preferably has a GPS function connected to satellites 1110a-n, of which only one is shown for reasons of clarity and simplicity. It also contains multiple software instances 1103a-n, including, but not limited to, an operating system, web browser, etc. In some cases instances 1103a-n may include an application that is part of the system disclosed herein, in other cases the system may execute as a script or applet that is downloaded by the browser when visiting a web site, and in yet other cases even other approaches may be used. All these different approaches may be considered, for purposes of describing the system disclosed herein, as equivalent in functionality. In this example, a download of system software comes from a web server. Web server operation cluster 1120 includes web server 1121, web service software instances 1122*a-n*, and mass storage device 1123, which contains additional databases and software instances 1124*a-n*. In some cases, web server operation cluster 1120 may be a single server, located, for example, at an operator's premises. In other cases, it may be a single server in a so-called "co-location" or cloud-based operation; and in yet other cases, it may be a cluster or large group of servers, or multiple servers, or multiple clusters or groups of servers. However, in most cases, cluster 1120 may be set up to appear to the application running on device 1102 as if it were one system.

Figure 25:
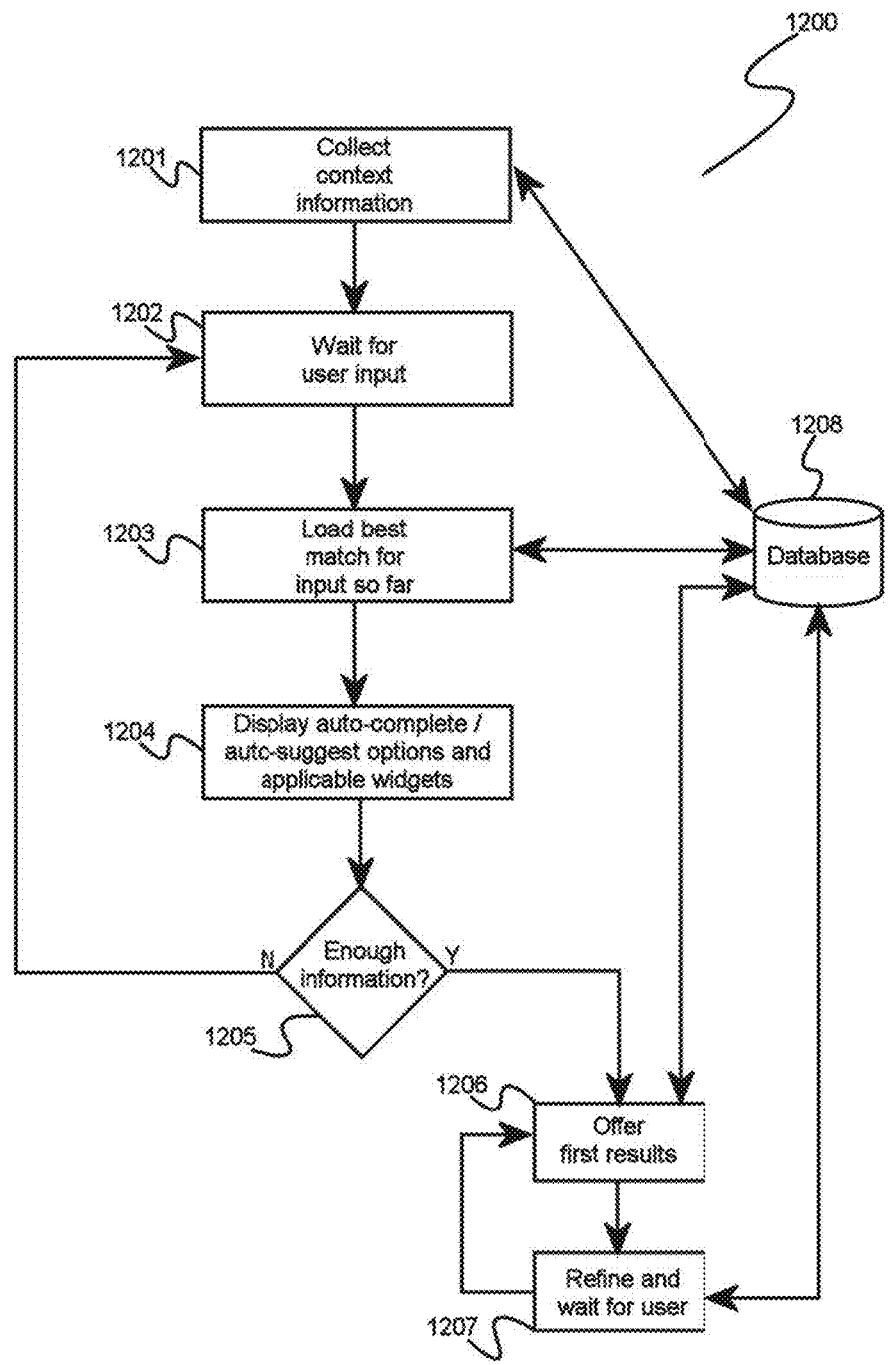
FIG. 25 is a method flow diagram, illustrating an exemplary process according to a preferred embodiment.

FIG. 25 shows an exemplary process 1200, according to one aspect of the system and method disclosed herein. Process 1200 follows the application running on the device, as described in the discussion of FIG. 24, above, and throughout. Said application can be a location application, it can be running locally in conjunction with a server, it can be running in a server displayed on a browser, or it can be running in a browser in conjunction with a server. For the purposes of the description of the system disclosed herein, all these approaches and any combination of these or similar approaches may be considered of equivalent functionality. In step 1201 the user initiates contact with the system, and the system pulls context information from data store 1208. This data store may be comprised of both local storage, such as, for example, cookies stored on the local device and other locally stored data, and of user profile information stored on the server, as well as additional information, such as location, extracted from, for example, GPS data and/or network connectivity location data. In step 1202 the system waits for input from the user. As soon as the user starts to type, in step 1203, the system loads the best match for the input so far, again, drawing from data store 1208. Such a match could be, for example, an auto-complete widget as is known from search engines today, or shopping sites that show what people typically would request. In step 1204 the system could display an auto-complete option or an auto-suggest option, and/or applicable widgets. Auto-complete and auto-suggest options differ, as described above in the discussion of FIG. 23. Auto-suggest options can, for example, make suggestions that go beyond the current scope of the search, adding things such as attributes, location, types, etc., to make the information supplied in response to the query more complete. These auto-complete and auto-suggest options may actually invoke one or more widgets that can attach themselves to the relevant section of text in the query box. In step 1205 the system checks to determine whether it has enough information to make an actual search and show results. If not (NO), the system cycles back to step 1202 and waits for more user input, which input could also include input from the various widgets that have popped up. If, in step 1205, the system determines that it has enough information (YES), in step 1206 the system populates an area below the query box with initial results. These results may be shown, for example, as items in a list or a dots on a map such that when the user touches on of the dots, additional information about the particular item is supplied. The shape and color of the dots, moreover, may impart sufficient information to the user so that he can make an initial selection of items of interests. Additionally, the system could display information riders such as cost, etc. Further, in some cases, for example, additionally, an indicia may indicate as soon as there's enough info for the query, further it may request the user to enter more, i.e. make the query even more specific, until the full template was entered. So in essence, step by step, the system may guide the user to fill in a complete template as required for a minimal response, and further offer additional requests to maximize the response value to user. For example the user may be shown an indicia, either with words or with colors, ranging from "mandatory" subsets (for example red when missing), "OK" (yellow) and "great query" (green) subsets and show these 3 different statuses: "Not enough info" "Enough but please be more specific" "Specific query" The user can interactively refine the selection within the ontology presented in the template offered, or simply change order and the ontology follows by selecting another suitable template, and from there the system in step 1207 can cycle back to step 1206 to offer additional results, or it can load the final proposal.

Figure 30:
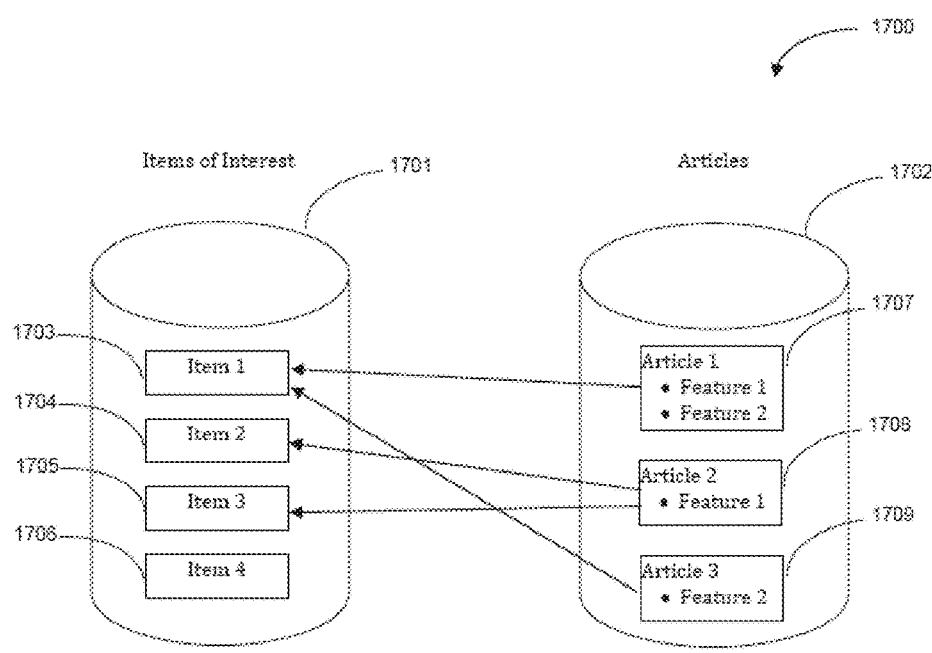
FIG. 30 shows an overview of an exemplary data structure interaction.

FIG. 30 shows an overview of an exemplary data structure interaction 1700, according to one aspect of the system and method disclosed herein. Database 1701 is comprised of items, including but not limited to items 1703 through 1706, which could be items or points of interest in one small, specific example. Database 1702 contains articles from selected sources, including but not limited to articles 1707 through 1709. It is important to obtain articles from sources of high quality, as discussed further below and throughout. By reading and analyzing those articles, IOIs (items) and/or their features, as extracted from the articles, can be highlighted, and by finding multiple references, said items and/or their features can be ranked accordingly. Thus by matching articles 1707 to items 1703 through 1706, and extracting all these items and/or their features of interest from the articles, the items in database 1701 can be classified and characterized filled with relevant items of interest with relevant features. Features (or attributes) can be further weighed according to the number of sources attesting to them, for instance item 1 has feature 2 according to both article 1 and article 3, therefore maybe this feature is strongly existent in item 1. Features can also be weighed by the source of the articles, for instance the source for article 1 may carry more weight than the source for article 2, and therefore item 1 will be deemed to have a stronger feature 1 than items 2 and 3. Furthermore, these articles themselves or excerpts from them are deemed relevant content, and when items are presented to a user of the system, the related articles, their sources, links to them and/or excerpts from them may be displayed, to add value and add weight to the system's assertion about the features of these items. In some cases, the relevancy can be further achieved improved in one of or two ways. One way is to look for clusters, or multiple sightings, and the other is to look for relevancy in a context, so that this article is only used as a reference, if it uses the item and or its features in a meaningful way, not just as a happenstance mention.

Figure 31:
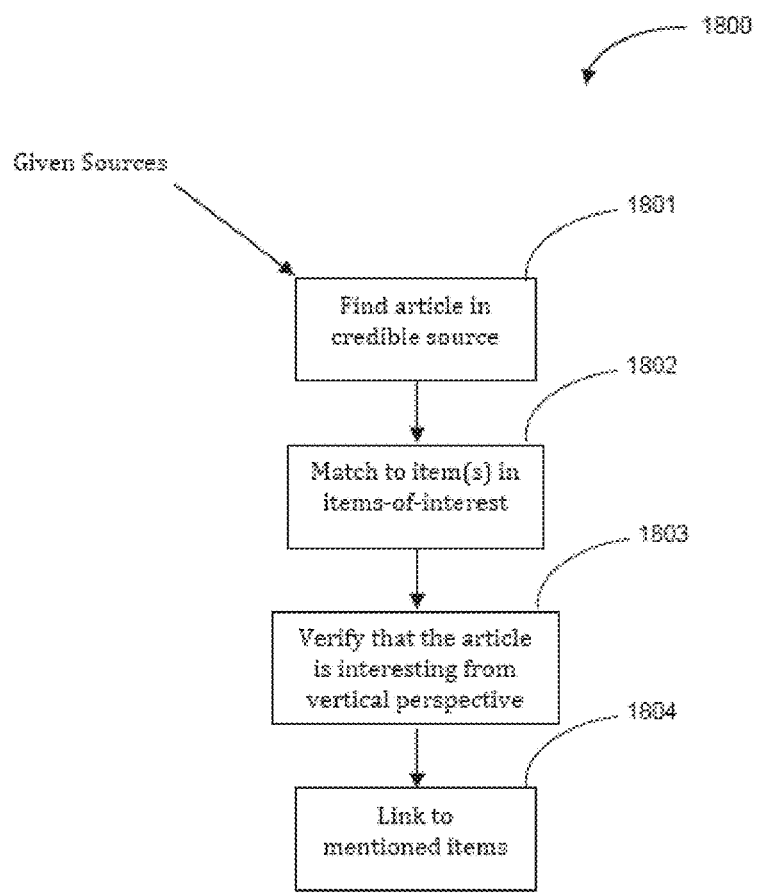
FIG. 31 shows an exemplary process for implementation of the system according to one aspect.

FIG. 31 shows an exemplary process 1800 for implementation of the system according to one aspect of the system and method disclosed herein. By using articles from given sources, in step 1801, the system finds an article from a credible source. In step 1802 the system matches the article to an item of interest. In some cases, items of interest may also be extracted from given sources, such as, for example, directories, listings, etc., and then by cross-referencing those items with articles of interest, the validity of the selection of said IOI can be verified or substantiated. In step 1803 the system verifies that the article is interesting from the vertical perspective, for instance that it is interesting to a user who is examining content in this vertical. Then in step 1804 the system creates links from the article to the mentioned items and back, and possibly also annotates them with the features attested to in the article with regards to the item and with excerpts relevant to these. These links enable the system, when presenting an item, to present the articles that mention it, and also if the system is presenting the item in the context of a specific feature, present the most relevant articles and excerpts first. A user, looking at an item later, to find can see which articles were used to find characterize the item and to designate the item, based on the article references, as an item of interest, thus building a "pedigree" for the item in the items list.

Figure 32:
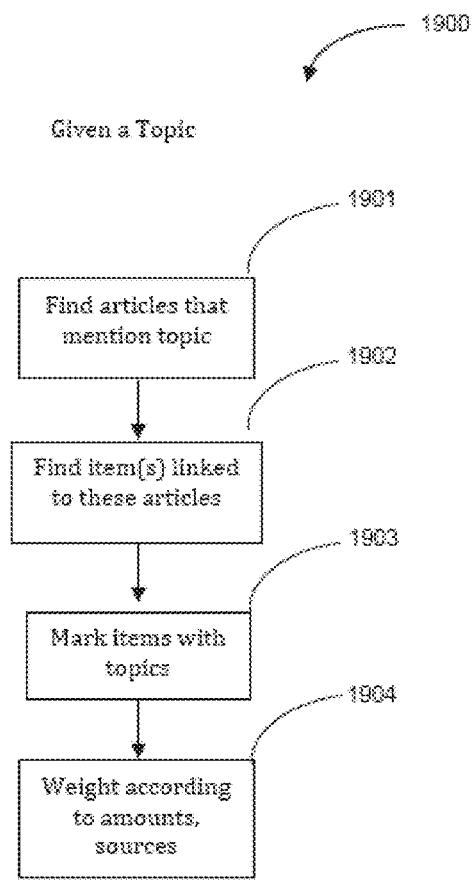
FIG. 32 shows an exemplary process for extraction of articles based on a topic, according to one aspect.

FIG. 32 shows an exemplary process 1900 for extraction of articles based on a topic, according to one aspect of the system and method disclosed herein. In step 1901 the system finds articles that mention a particular topic. In step 1902, the system links these articles to items in the IOI database, based on context mentioned of these items in the articles. In step 1903 the items are marked with topic tags, and in step 1904 are weighted according to the number and quality of sources referring them, creating a measure for ranking the items. For example, if a user wants to see the top 50 items in conjunction with playing golf, he's going to see a different list that a user who asks for the top 50 items about natural vistas, etc.

It is clear that many modifications and variations of the system and method disclosed herein may be made by one skilled in the art without departing from the spirit of the novel art of this disclosure.

In some cases, a user seeking information, for example travel destinations, may enter a query into a query box, where a set of auto-complete and auto-suggest rules, based on a template derived from the initial user inputs and offered in the form of one or more widgets, is used to elicit a complete query from the user. These widgets may be in the form of combination widgets, text templates, auto suggest widgets and auto-complete widgets. If the user overwrites at least part of a word, a new template may apply, and new widgets may be launched. In cases where the number of results exceeds a certain threshold, the system may solicit additional information with further auto-suggest widgets. Further, the system may accept spoken user input by continuous speech recognition (word by word) with auto suggest templates and dynamic widgets on screen for faster completion, enabling the user to manually select responses. Additionally, an auto-complete widget may enable speech selections by the user, and the user may have the option to use speech to supply missing items in a template. Even though detailed exemplary description of travel destination s are discussed herein, nothing herein shall be viewed as limiting this approach to travel, it could be used for any kind of search, where templates can be made available, as well as widgets, auto complete and auto suggest can help the user achieve a complete query.

Also, in some cases, the initial template selection may start with context such as time of day, GPS location, way traveled recently etc. rather than user input to start with. Further, widgets maybe added and or removed dynamically, or in some cases under partial or full user control in some cases, the template may change when the user overwrites or changes selections, but certain types of changes may not be allowed, for example if the user wants to enter a town that is not contained in the dictionary. In this kind of situation, the user may be offered similar written or pronounced names from the dictionary, but not his "free style" entry, as the system would not be able to present meaningful results.

In some cases, the system may cross-reference items of interest with articles and other suitable data from various select information sources, and then create links from the article to the mentioned items and back. Further, the system may verify that the article is interesting from the vertical perspective. By matching items of interest to preferences expressed by a user, the system may then present one or more items of interest to a user, and also offer the user the option to view excerpts or full articles for each item offered. In addition, the system may similarly find articles and other data that mention a particular topic, and then link the articles to items based on context. The system may mark the items with topic tags and weights the items according to the number and quality of sources referring to them, creating a measure for ranking the items.

These modifications and variations do not depart from its broader spirit and scope, and the examples cited here are to be regarded in an illustrative rather than a restrictive sense.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The skilled person will be aware of a range of possible modifications of the various embodiments described above.

We claim:

1. A method of improving user retrieval of travel search results, the method comprising:

retrieving, using a processor, a plurality of documents in response to a travel search query;

identifying, using the processor, a subset of travel documents within the plurality of documents based on text of the plurality of documents, wherein the travel documents contain data indicative of travel;

sorting, by the processor, the subset of travel documents into one or more indexes based on a type of travel search query;
selecting, by the processor, an index of the one or more indexes based on the type of travel search query;
identifying, using the processor, points of interest (POIs) referenced by or described in the travel documents of the selected index based on text of the travel documents of the selected index, wherein the POIs are associated with and relevant to the type of travel search query, and wherein identifying the POIs comprises tagging, by the processor, the travel documents containing the POIs;
identifying, using the processor, travel traits for the identified POIs based on text of the travel documents of the selected index, wherein the travel traits comprise facts that describe the POIs, the facts being indicative of travel;
calculating, using the processor, a POI relevance score for each travel document of the selected index based on text contained within each travel document of the selected index associated with the identified POIs, wherein the POI relevance score indicates how likely the text is relevant to the travel search query;
calculating, using the processor, a trait inclusion score for each travel document of the selected index based on the identified travel traits associated with the identified POIs, wherein the trait inclusion score indicates the type or level of detail of description of the POI in the travel documents of the selected index; and
providing the travel documents of the selected index in a ranked order based on the POI relevance score and the trait inclusion score.

2. The method of claim 1, further comprising:
analyzing text contained in the travel documents of the selected index associated with at least one of the points of interest to determine an ambiguity score;
comparing the ambiguity score to a threshold; and
removing one or more of the travel documents of the selected index in response to the ambiguity score being above the threshold.

3. The method of claim 1, further comprising:
storing a ranked subset of the travel documents of the selected index for each of the POIs.

4. The method of claim 1, further comprising:
identifying a type of travel document from text of the travel documents of the selected index; and
assigning a travel type score based on the type of travel document.

5. The method of claim 1, further comprising:
extracting a portion of one of the travel documents of the selected index based on a respective POI relevance score.

6. The method of claim 1, further comprising:
identifying, using the processor, travel amenities for the POIs from the travel documents of the selected index.

7. The method of claim 1, further comprising:
identifying, using the processor, whether one of the POIs dominates a respective one of the travel documents of the selected index.

8. The method of claim 1, further comprising:
identifying, using the processor, reviews for the POIs from the travel documents of the selected index.

9. The method of claim 1, further comprising:
receiving a travel search from a user;
identifying a POI and a least one qualifying query from the travel search;
accessing the travel documents ranked based on the POI relevance and trait inclusion scores; and
providing the travel documents in an order based on the ranking of the travel documents from the POI relevance and trait inclusion scores and based on the at least one qualifying query.

10. The method of claim 1, wherein the trait inclusion score is based on a number of traits, types of traits, or combinations thereof.

11. An apparatus for improving user retrieval of travel search results, the apparatus comprising:
at least one processor; and
at least one memory including computer program code for one or more programs; the at least one memory and the computer program code configured to, with the at least one processor, cause the apparatus to at least perform:
identify, in response to a travel search, a plurality of travel documents, wherein the plurality of travel documents contain data indicative of travel;
sort the plurality of travel documents into one or more indexes based on a type of travel search;
select an index of the one or more indexes based on the type of travel search;
identify points of interest (POIs) contained in the travel documents of the selected index, wherein identifying the POIs comprises tagging, by the processor, the travel documents containing the POIs;
identify travel traits for the identified POIs within the travel documents of the selected index, wherein the travel traits comprise facts that describe the POIs, the facts being indicative of travel;
calculate a POI relevance score for each travel document in the selected index based on text associated with the identified POIs, wherein the POI relevance score indicates how likely the text is relevant to the travel search;
calculate a trait inclusion score for each travel document in the selected index based on the identified travel traits associated with the identified POIs, wherein the trait inclusion score indicates the type or level of detail of description of the POIs in the travel document; and
store respective POI relevance and trait inclusion scores for the travel documents of the selected index.

12. The apparatus of claim 11, wherein the at least one memory and the computer program code are configured to, with the at least one processor, cause the apparatus to at least perform:
receive a travel search including data indicative of a POI; and
generate search results based on the POI relevance and trait inclusion scores.

13. The apparatus of claim 12, wherein the travel search includes data indicative of a qualifier for the POI, and the at least one memory and the computer program code are configured to, with the at least one processor, cause the apparatus to at least perform:
filter the search results according to the qualifier.

14. The apparatus of claim 11, wherein the at least one memory and the computer program code configured to, with the at least one processor, cause the apparatus to at least perform:
determine ambiguity scores for the points of interest based on text within the travel documents of the selected index associated with the points of interest;
compare the ambiguity scores to a threshold; and
remove one or more of the travel documents of the selected index in response to one or more of the ambiguity scores being above the threshold.

15. The apparatus of claim 11, wherein the at least one memory and the computer program code configured to, with the at least one processor, cause the apparatus to at least perform:

store a ranked subset of the travel documents of the selected index for each of the POIs.

16. The apparatus of claim 11, wherein the at least one memory and the computer program code configured to, with the at least one processor, cause the apparatus to at least perform:

identify a type of travel document from text of the travel documents of the selected index; and assign a travel type score based on the type of travel document.

17. The apparatus of claim 11, wherein the at least one memory and the computer program code configured to, with the at least one processor, cause the apparatus to at least perform:

extract a portion of one of the travel documents of the selected index based on a respective POI relevance or trait inclusion score.

18. A method of improving user retrieval of travel search results, the method comprising:

receiving a travel search from a user;

identifying, using a processor, a point of interest (POI) and a least one qualifying query from the travel search;

identifying, using the processor based on the travel search, a plurality of documents in response to the travel search;

sorting, by the processor, the plurality of documents into one or more indexes based on a type of travel search;

selecting, by the processor, an index of the one or more indexes based on the type of travel search;

calculating, using the processor, a POI relevance score and a trait inclusion score for each document of the selected index, wherein the POI relevance score indicates how likely each document of the selected index is relevant to the travel search and wherein the trait inclusion score indicates how well travel related details are known about the POI in each document of the selected index;

receiving a subset of the documents of the selected index ranked based at least on the POI relevance score and the trait inclusion score; and displaying the subset of the documents of the selected index in an order as ranked from the POI relevance and trait inclusion scores, by the processor, and based on the at least one qualifying query.

19. The method of claim 18, further comprising:

calculating a matching score for each of the documents of the subset of the documents of the selected index based on the at least one qualifying query.

20. An apparatus comprising:

at least one processor; and at least one memory including computer program code for one or more programs; the at least one memory and the computer program code configured to, with the at least one processor, cause the apparatus to at least perform:

identify a travel search from a user, wherein the travel search includes a qualifying term and a point of interest (POI) or a location for the POI;

identify a plurality of documents in response to the travel search;

sort the plurality of travel documents into one or more indexes based on a type of travel search;

select an index of the one or more indexes based on the type of travel search;

calculate a POI relevance score and a trait inclusion score for each document of the selected index, wherein the POI relevance score indicates how likely each document of the selected index is relevant to the travel search and wherein the trait inclusion score indicates how well travel related details are known about the POI in each document of the selected index;

receive a subset of the documents of the selected index ranked based on the POI relevance score and the trait inclusion score; and display the subset of the documents of the selected index in an order based on a ranking of the documents of the selected index from the POI relevance and trait inclusion scores and based on the at least one qualifying query.

\* \* \* \* \*